(12) United States Patent
Zink et al.

(10) Patent No.: US 10,922,824 B1
(45) Date of Patent: Feb. 16, 2021

(54) OBJECT TRACKING USING CONTOUR FILTERS AND SCALERS

(71) Applicants: VOLKSWAGEN AG, Wolfsburg (DE);
AUDI AG, Ingolstadt (DE);
PORSCHE AG, Stuttgart (DE)

(72) Inventors: Edmund Dawes Zink, McKinney, TX (US); Douglas Allen Hauger, San Francisco, CA (US); Lutz Junge, San Mateo, CA (US); Jerramy L. Gipson, Willits, CA (US); Joerg Christian Wolf, Foster City, CA (US); Qiang Liu, Belmont, CA (US)

(73) Assignees: Volkswagen AG; Audi AG; Porsche AG

( * ) Notice: Subject to any disclaimer, the term of this patent is extended or adjusted under 35 U.S.C. 154(b) by 0 days.

(21) Appl. No.: 16/539,642

(22) Filed: Aug. 13, 2019

(51) Int. Cl.
*G01B 11/16* (2006.01)
*C12Q 1/02* (2006.01)
(Continued)

(52) U.S. Cl.
CPC .......... *G06T 7/248* (2017.01); *G06K 9/00791* (2013.01); *G06K 9/4609* (2013.01); *G06K 9/48* (2013.01); *G06T 3/60* (2013.01); *G06T 7/33* (2017.01); *G06T 7/536* (2017.01); *H04N 5/23254* (2013.01); *H04N 5/23267* (2013.01); *B60R 1/00* (2013.01); *B60R 2300/20* (2013.01); *B60R 2300/30* (2013.01); *G05D 1/0246* (2013.01); *G05D 2201/0213* (2013.01);
(Continued)

(58) Field of Classification Search
CPC .......... G06T 7/248; G06T 7/536; G06T 7/33; G06T 3/60; G06T 2207/10016; G06T 2207/30252; G06K 9/00791; G06K 9/4609; G06K 9/48; H04N 5/23254; H04N 5/23267; B60R 1/00; B60R 2300/20; B60R 2300/30; G05D 1/0246; G05D 2201/0213
See application file for complete search history.

(56) References Cited

U.S. PATENT DOCUMENTS

| 5,625,717 A | * | 4/1997 | Hashimoto | G06K 9/34 382/260 |
| 6,020,953 A | | 2/2000 | Barrows | |

(Continued)

OTHER PUBLICATIONS

Office Action for U.S. Appl. No. 15/674,990; dated Aug. 2, 2019.
(Continued)

*Primary Examiner* — Joon Kwon
(74) *Attorney, Agent, or Firm* — Barnes & Thornburg LLP

(57) ABSTRACT

A system, components, and methodologies are provided for image data processing and subsequent use to detect and/or identify objects and object movement in such image data to enable assistance, automation, control and/or documentation regarding transportation vehicle movement. An affine contour filter provides the ability to extract precise sub-pixel roots of contours that represent boundaries of blobs in an image that undergoes small affine changes such as translation, rotation and scale. Thereby lateral contour tracking may be performed wherein movement of an object may be tracked within the field of view of a camera by aligning the contours associated with the object in space-time. As a result, the size and shape of the object to be tracked need not be specified ahead of time.

25 Claims, 16 Drawing Sheets

(51) Int. Cl.

| | | |
|---|---|---|
| *G01N 33/483* | (2006.01) | |
| *G06T 7/246* | (2017.01) | |
| *G06K 9/46* | (2006.01) | |
| *G06K 9/48* | (2006.01) | |
| *G06K 9/00* | (2006.01) | |
| *G06T 7/536* | (2017.01) | |
| *H04N 5/232* | (2006.01) | |
| *G06T 3/60* | (2006.01) | |
| *G06T 7/33* | (2017.01) | |
| *B60R 1/00* | (2006.01) | |
| *G05D 1/02* | (2020.01) | |

(52) U.S. Cl.
CPC .............. *G06T 2207/10016* (2013.01); *G06T 2207/30252* (2013.01)

(56) References Cited

U.S. PATENT DOCUMENTS

| | | | |
|---|---|---|---|
| 6,023,521 | A | 2/2000 | Sarpeshkar et al. |
| 6,212,289 | B1 | 4/2001 | Sarpeshkar et al. |
| 6,384,905 | B1 | 5/2002 | Barrows |
| 7,388,988 | B2 * | 6/2008 | Luo .................... G06T 17/00 375/E7.081 |
| 7,659,967 | B2 | 2/2010 | Barrows et al. |
| 7,925,051 | B2 | 4/2011 | Gensolen et al. |
| 8,098,886 | B2 | 1/2012 | Koch et al. |
| 8,332,340 | B2 | 12/2012 | Snider |
| 8,401,297 | B1 | 3/2013 | Apostolos et al. |
| 8,694,449 | B2 | 4/2014 | Weng et al. |
| 8,780,240 | B2 | 7/2014 | Posch et al. |
| 8,930,291 | B1 | 1/2015 | Srinivasa et al. |
| 8,959,040 | B1 | 2/2015 | Cruz-Albrecht et al. |
| 9,014,416 | B1 | 4/2015 | Fisher et al. |
| 9,047,568 | B1 | 6/2015 | Fisher et al. |
| 9,070,039 | B2 | 6/2015 | Richert |
| 9,098,811 | B2 | 8/2015 | Petre et al. |
| 9,111,215 | B2 | 8/2015 | Piekniewski |
| 9,111,226 | B2 | 8/2015 | Richert |
| 9,123,127 | B2 | 9/2015 | Richert |
| 9,129,221 | B2 | 9/2015 | Piekniewski et al. |
| 9,152,915 | B1 | 10/2015 | Gabardos et al. |
| 9,183,493 | B2 | 11/2015 | Richert et al. |
| 9,186,793 | B1 | 11/2015 | Meier |
| 9,195,903 | B2 | 11/2015 | Andreapoulos et al. |
| 9,195,934 | B1 | 11/2015 | Hunt et al. |
| 10,133,944 | B2 | 11/2018 | Zink et al. |
| 10,229,341 | B2 | 3/2019 | Zink et al. |
| 10,235,565 | B2 | 3/2019 | Zink et al. |
| 2003/0052971 | A1 * | 3/2003 | Gutta .................... H04N 7/181 348/159 |
| 2009/0262247 | A1 * | 10/2009 | Huang .................... G06T 3/403 348/625 |
| 2013/0251209 | A1 * | 9/2013 | Kim .................... G06K 9/00825 382/106 |
| 2014/0064609 | A1 | 3/2014 | Petre et al. |
| 2014/0229411 | A1 | 8/2014 | Richert et al. |
| 2014/0258195 | A1 | 9/2014 | Weng et al. |
| 2015/0161505 | A1 | 6/2015 | Sugioka |
| 2018/0173934 | A1 | 6/2018 | Zink et al. |
| 2018/0173983 | A1 | 6/2018 | Zink et al. |
| 2018/0173992 | A1 | 6/2018 | Zink et al. |
| 2018/0207423 | A1 | 7/2018 | Benosman et al. |
| 2018/0249093 | A1 * | 8/2018 | Saeki .................... H04N 5/2628 |
| 2019/0017811 | A1 * | 1/2019 | Watanabe .............. G06T 7/20 |
| 2019/0116322 | A1 * | 4/2019 | Holzer .................... G06T 13/40 |
| 2019/0213388 | A1 * | 7/2019 | Makeev ............... A61B 5/1072 |

OTHER PUBLICATIONS

Brändli; Event-Based Machine Vision; Doctoral Thesis; 2015.
Floreano et al.; Miniature curved artificial compound eyes; PNAS; Jun. 4, 2013; pp. 9267-9272; vol. 110, No. 23.
Garcia et al.; pyDVS: An Extensible, Real-time Dynamic Vision Sensor Emulator using Off-the-Shelf Hardware; 2016 IEEE Symposium Series on Computational Intelligence (SSCI); Dec. 6, 2016; pp. 1-7.
Kuhn; Fast MPEG-4 Motion Estimation: Processor Based and Flexible VLSI Implementations; Journal of VLSI Signal Processing Systems for Signal, Image, and Video Technology; Oct. 1, 1999; vol. 23, No. 1; pp. 67-92.
Mueggler et al.; Lifetime Estimation of Events from Dynamic Vision Sensors; 2015 IEEE International Conference on Robotics and Automation (ICRA); IEEE; May 26, 2015; pp. 4874-4881.
Rueckauer et al.; Evaluation of Event-Based Algorithms for Optical Flow with Ground-Truth from Inertial Measurement Sensor; Frontiers in Neuroscience; Apr. 25, 2016; vol. 10, Article 176.
Tsang et al.; Neuromorphic Implementation of Active Gaze and Vergence Control; Department of Electronic and Computer Engineering, Hong Kong University of Science and Technology; 2008; pp. 1076-1079.
Tschechne et al.; Bio-Inspired Optic Flow from Event-Based Neuromorphic Sensor Input; ECCV 2016 Conference; Oct. 6, 2014; pp. 171-182.
Search Report and Written Opinion for International Patent Application No. PCT/EP2017/083411; dated Mar. 21, 2018.

* cited by examiner

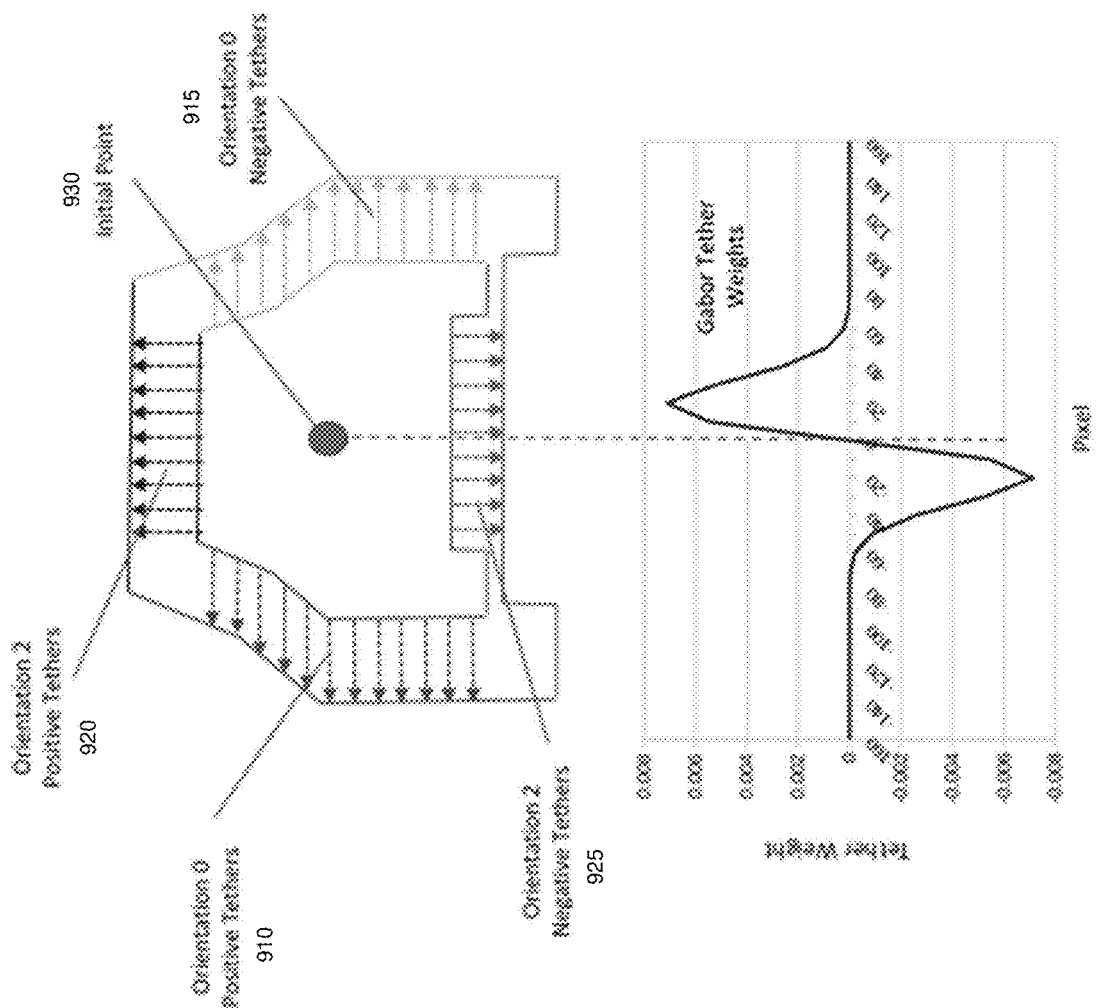

OBJECT TRACKING USING CONTOUR FILTERS AND SCALERS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

The present disclosure relates to systems, components, and methodologies for image processing. In particular, the present disclosure relates to systems, components, and methodologies that perform image processing.

Disclosed embodiments have particular utility for, but are not limited to, performing image processing of digital NeuroMorphic (NM) image data, as disclosed in U.S. Pat. No. 10,133,944 to Zink, et al. and issued Nov. 20, 2018 (incorporated by reference in its entirety).

SUMMARY

According to the present disclosure, systems, components, and methodologies are provided for image data processing and subsequent use to detect and/or identify objects and object movement in such image data for assistance, automation, control and/or documentation.

Disclosed embodiments provide an affine contour filter that provides the ability to extract precise sub-pixel roots of contours that represent the boundaries of blobs in an image that undergo small affine changes such as translation, rotation and scale.

In accordance with various disclosed embodiments, lateral contour tracking may be performed wherein movement of an object may be tracked within the field of view of a camera by aligning the contours associated with the object in space-time. As a result, a point guaranteed to be on an object to be tracked may be specified in a first image and, thereafter, used to enable providing relative size updates for the object on a periodic basis so as to determine whether the tracked object is appearing larger (thereby indicating a distance between the camera and the object is decreasing) or smaller (thereby indicating a distance between the camera and the object is increasing). In accordance with at least these embodiments, the size and shape of the object to be tracked need not be specified ahead of time. Nevertheless, the position of tracked object may be determined on a sub-pixel basis so as to provide what may be considered to be "stabilized" video image data.

In accordance with various embodiments, contour scaled tracking may be performed using such stabilized video data. More specifically, the scale change of contours associated with a tracked object may be measured without prior knowledge of object size or shape.

Accordingly, by tracking the scale change of contours in this way, disclosed embodiments may be implemented to improve the accurate of long range relative depth tracking by measuring the relative size change of an object using the stabilized data provided by the affine contour filter.

Moreover, in accordance with various disclosed embodiments, contours associated with an object being tracked using this long range relative depth tracking may be identified and associated with the tracked object to further improve accuracy.

In accordance with various embodiments, rotation of such image data may also be provided to identify relative rotational movement between a camera and a tracked object to reduce or eliminate the effect of such movement.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 4 illustrates a block diagram of an example of a disclosed embodiment including lateral tracking functionality.

FIG. 5 provides an example of the Gaussian weights applied to the tethers around the initial point.

FIG. 6 illustrates a plot of the translations required to align incoming frames to the map frame, wherein the x axis indicates the frame index (the index number of each frame) and the y axis indicates the pixel offset performed.

FIGS. 7 and 8 indicate how local movement may restored to improve accuracy by alignment on sub-pixel boundaries, in accordance with the disclosed embodiments.

FIGS. 9-10 provide illustrative descriptions for explaining object scaling to enable measurement of the relative range to the tracked object without prior knowledge of the object size or shape, in accordance with the disclosed embodiments. In particular, FIG. 9 illustrates an exemplary diagram of orientation tethers being applied to an incoming frame and a map frame with Gabor weights applied to the tethers around an initial point. FIG. 10 illustrates an example of output of the relative scale change graphed as a function of frame number.

DETAILED DESCRIPTION

Figure 1:
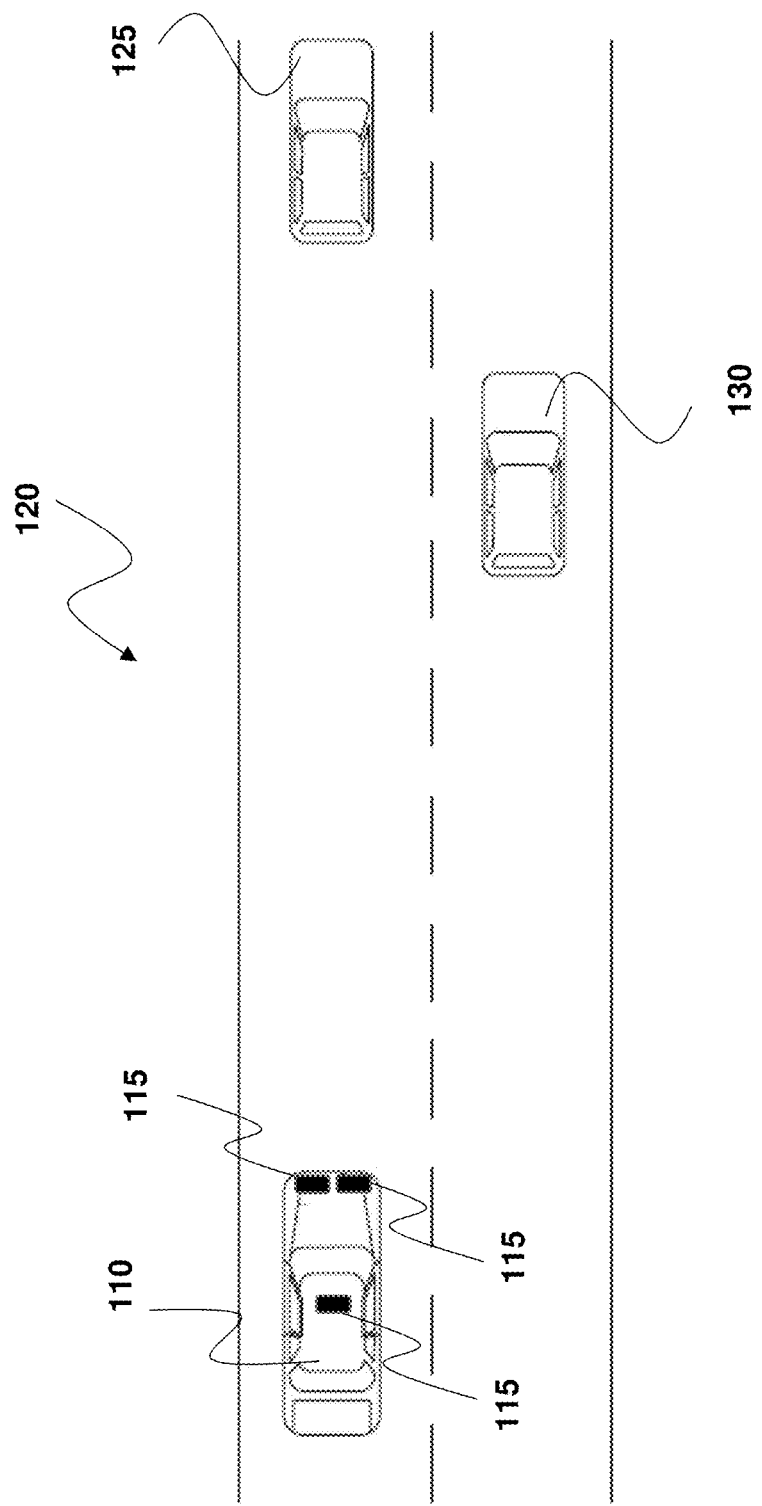
FIG. 1 illustrates a physical relationship between an ego vehicle that may include one or more image sensor(s) to determine the position of the ego vehicle relative to a roadway and other transportation vehicles in various lanes of traffic on the roadway.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are directed to structure and software for simulation of conventional NM system vision functionality, e.g., that provided by the human eye.

Commercially available image detection and processing equipment routinely use solid-state detectors to capture large numbers of frames each second. By displaying those images at high speed, the viewer has the illusion of motion. This is the basis of recorded video images.

However, when such video data is analyzed by computers running image processing and analysis software, the large number of frames used to give the impression of motion can overwhelm the computational capability of the computers. This is because a high frame rate video may provide so much data that the computer is incapable of analyzing the data because the data is changing too quickly. Conventionally, efforts have been made to increase the ability for image processing by increasing the processing speed of processors analyzing the image data.

Alternatively, recent advancements have been made in the area of Neuromorphic (NM) processing techniques that mimic or simulate the human eye. NM processing relies on the idea that it is not necessary to analyze all of the data included in a video image; rather NM prioritizes analysis on determining the changes that occur in the image data while de-prioritizing the image data that remains the same from frame to frame because the non-changing data is redundant.

More specifically, by mimicking operation of the human eye and brain, processors and software can capture and identify image data of interest, spatial and temporal changes, and output that data for labor intensive image processing that enables all aspects of image processing, automation and assistive control, analysis and diagnostic systems utilizing image processing.

This requires the ability to continuously track and record pixel amplitudes for only those pixels amplitudes changes above a prescribed threshold. Conventionally, this approach has been implemented using analog NM cameras; however, application of such technology provides high effective frame rates but with spatial image sizes and spatial resolutions due to the extra cost of analog processing embedded into each pixel of the imager. Thus, until recently (see U.S. Pat. No. 10,133,944), there been no conventional mechanism to effectively use NM image processing for real-time acquired image data.

With such recent technological advances in mind, disclosed embodiments provide an affine contour filter that provides the ability to extract precise sub-pixel roots of contours that represent the boundaries of blobs in an image that undergo small affine changes such as translation, rotation and scale.

Disclosed embodiments are based on the recognition that, although roots may be generated such that the roots are lying on row (orientation 1) and column (orientation 2) boundaries (see U.S. Pat. No. 10,133,944), it is also possible to generate roots on the sub-pixel level through application of an affine transformation and resampling the image based on a very small affine mapping.

The term "affine transformation" refers to a linear mapping operation that preserves points, straight lines, and planes. In accordance with disclosed embodiments, an affine transformation may be used to apply relative translation, rotation, and scaling to an image. This may be performed resampling an image under minor (small) relative translation, rotation, and scale changes with the goal of preserving its underlying root structure. Applying the affine transformation and resampling enables the ability to identify significantly smaller changes in the size or position of a detected object, thereby improving the sensitivity of the hardware based on this change.

In this way, disclosed embodiments provide the ability to increase equipment sensitivity for depth (indicative of scale), also thought of as longitudinal movement (distance to sensor), as well as lateral movement and relative rotational movement.

Various disclosed embodiments provide technical utility in that the image processing engine utilizes an affine contour filter to improve image processing precision. Conventionally, there is no mechanism for extracting precise sub-pixel roots of contours that represent the boundaries of blobs (i.e., continuously connected component in image data that results from taking the double derivative of the image intensity surface using 2D band-pass filtering) set of data indicative of an object or part of an object in a field of view of an image sensor), which are linked contours identified indicative of an object in image data, when the image is susceptible to small affine changes such as translation, rotation, and scale. For example, when image data is generated by an image sensor, e.g., camera or other known image detection equipment, that is in motion, the image data acquired by the image sensor are particularly susceptible to translation, rotation and changes of image scale because of the relative movement of the image sensor to the objects included in an image scene detected by the sensor.

Conventionally, image sensors have dealt with each of these issues, i.e., translation, rotation and scale changes, separately. To the contrary, disclosed embodiments provide technical innovations in processing image data that enable improvements for each of these issues by computing changes of roots, which are points on a blob contour or boundary between two blob contours.

As a result, by capturing small affine movements in this way, the disclosed embodiments provide technical utility by enabling improved precision for image processing of data of this type, for, for example, object tracking performed by mobile image sensors.

For example, as shown in FIG. 1, an ego vehicle 110, may include one or more image sensor(s) 115 that may be used to not only determine the position of the ego vehicle 110 relative to the roadway 120 on which it is travelling, but also positioning of other transportation vehicles 125 and 130 in various lanes of traffic on the roadway 120. Providing precise image data regarding these locations and the relative positions is necessary for enabling effective scout/following car operations, e.g., platooning and other assistive/autonomous driving functionality.

For the purposes of this disclosure, the phrase "autonomous and/or assistive functionality" refers to functionality that enables the partial, full or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and which warn the driver and, if no action is taken, automatically take steps to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surrounding to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems which take over steering, keep the transportation vehicle centered in the lane of traffic.

Likewise, autonomous and/or assistive functionality may include high automation (level four) and complete automation (level five), wherein on-vehicle equipment enable automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

With this understanding of potential implementation of on-vehicle sensors for autonomous and/or assistive functionality in mind, presently disclosed systems, components, and methodologies may be provided to improve object tracking by capturing small affine movements in detected image data captured by image sensors positioned on a transportation vehicle regarding the surroundings of vehicle.

For example, consider the implementation, wherein live video image data generated by one or more sensors on to transportation vehicle is displayed on a touch screen included in the transportation vehicle to enable the driver or a passenger in the vehicle to press a point on the touch screen associated with an object, e.g., another vehicle, included in the displayed screen. As explained herein, that operation may enable or trigger functionality that provides the ability to track the object in the video image data with increased accuracy by capturing and analyzing small affine movements in the image data while addressing translation, rotation and scale changes in interrelated manner.

Robust scale estimation is conventionally a significant technical obstacle to real world implementation of accurately and safely delivered autonomous and/or assistive functionality, in particular for detecting objects at significant and variable distances from a moving vehicle. As a result, disclosed embodiments may enable the ability to provide vehicle following functionality at RADAR and LIDAR ranges (for example, 150 meters) and, in one situation could be used as an alternative technology for implementing Adaptive Cruise Control.

Figure 2:
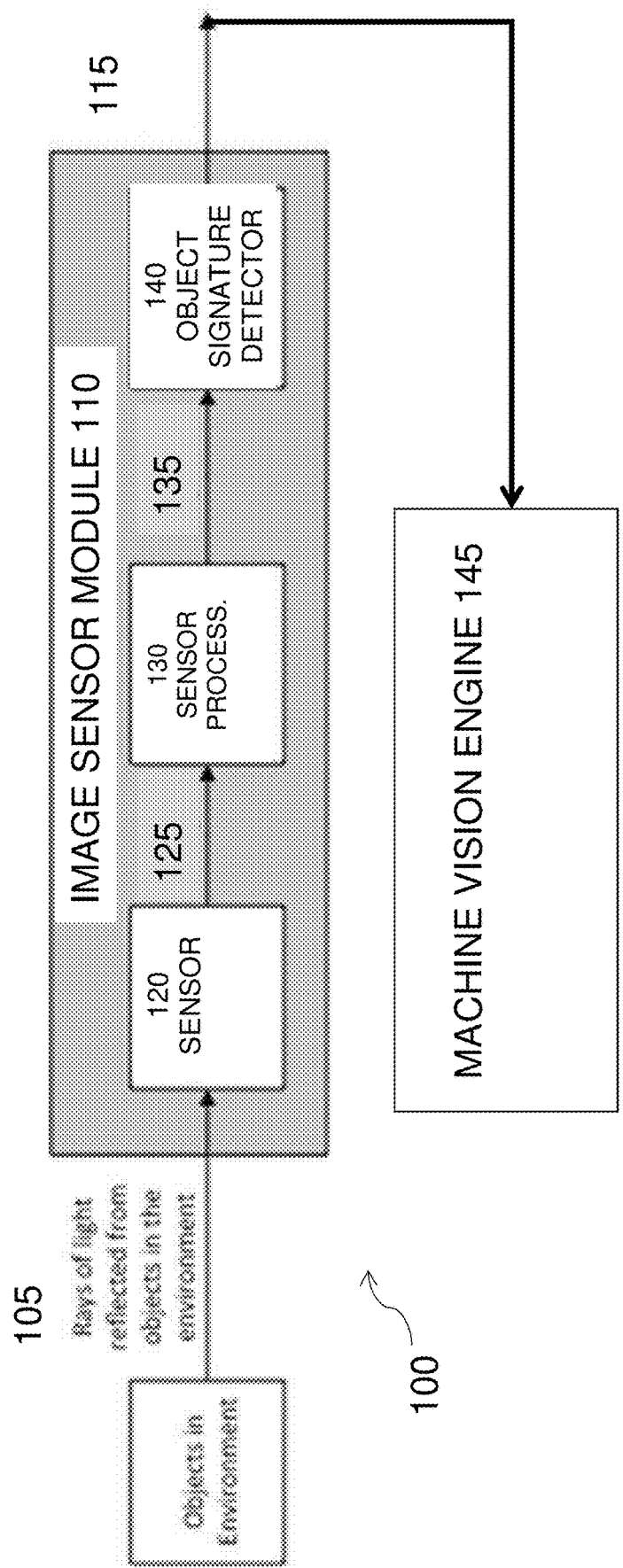
FIG. 2 illustrates structure and software implemented functionality provided for a machine vision system in accordance with disclosed embodiments.

As shown in FIG. 2, structure and software are provided for a machine vision system 100. The machine vision system 100 is illustratively embodied as including an image sensor module 110 for detecting images and performing at least certain portions of object recognition operations as discussed herein. The image sensor module 110 illustratively includes one or more sensors 120 for receiving light 105 from an object with the field of the view of the sensor(s) 120 and converting the light 105 into image data 125.

Sensor 120 may output the image data 125 into one or more sensor processors 130 that convert that image data into shapelet data that may include intensity data and data derived or derivable from such intensity data, including "spikes," "roots", "blobs" and associated data using image processing and data processing techniques explained herein. More specifically, in at least one embodiment, the sensor processor 130 includes digital circuitry that generates spike data indicative of a spike whenever the measured intensity value exceeds a threshold.

Additionally, the sensor processor 130 may be configured to generate shapelet data 135 based on the image data 125, and output that shapelet data to an object signature detector 140 for extracting features of the object from the shapelet data 135. As discussed in additional detail below, shapelet data 135 illustratively includes image data economized for vision processing. Thus, shapelet data 135 is provided by the sensor processor 130 to the object signature detector 140 for subsequent analysis to formulate one or more object signatures 115 for subsequent analysis by a machine vision engine 145.

The shapelet data 135 may include economized image data, which can include any suitable targeted economization of the image data, and may include light intensity data, and/or data derivable therefrom using image processing and data processing techniques explained herein (e.g., "spikes," "roots", "blobs" and associated data). More specifically, in at least one embodiment, the sensor processor 130 can be used to provide (i.e., define, identify, generate, and/or otherwise establish) other economized image data, for example, roots, blobs, and/or other image processing data based on the image data 125, which are all referred to collectively and individually as "shapelet data."

As a result, root association may be performed, which requires generation of shapelet data 135 that may include blobs, roots and spikes along an orientation and associating the roots. Moreover, roots can be linked or associated unambiguously with each other to enable extraction of contours, or edges (i.e., deterministic linkages of roots comprising contours) related to the image data and preferably related to the object 115. The extracted contours can be used to discern object motion within the field of view of an image sensor, which enables object tracking. This involves the generation of velocity vector data, which include "velocity vectors" which are a mathematical representation of optical flow of pixels in image data, wherein a velocity may be considered to be an angle in space-time, which may be conceptually thought of as a stack of temporally ordered images.

Thus, velocity vector data may be used to characterize or represent a velocity space, which may be thought of as the spatial and temporal representation of video data which includes a sequence of temporally ordered spatial images in a plurality of frames depicting movement of an object in an environment. More specifically, in velocity space, pixels having the same velocity vector may be aggregated and associated with one another to perform velocity segmentation, which enables the ability to identify and differentiate objects within the image data based on their relative motion over frames of image data. Thus, velocity vector data may be used to indicate basic features (e.g., edges) of objects included in the image data, by identifying boundaries between the edges of the objects in the image data. This data may, therefore, be used to define one or more boundaries between foreground objects and background, thus creating velocity silhouettes, or blobs. In this way, velocity silhouettes, or blobs, may define edges at the boundary between a foreground object and a background object.

In this way, disclosed embodiments provide a machine vision system including an image sensor module that includes at least one sensor, and potentially an array of sensors, a sensor processor and an object signature detector 140. The machine vision system 100 also can include a machine vision engine 145 that can perform further image and data processing operations on the velocity vector data generated by the image sensor module that enables image data processing for further processing, for example, object classification, including machine and deep learning. As such, in accordance with at least one embodiment, the machine vision engine 145 may include one or processors running software to output data for analysis and subsequent control of components with the environment imaged by the image sensor module 110.

Figure 3:
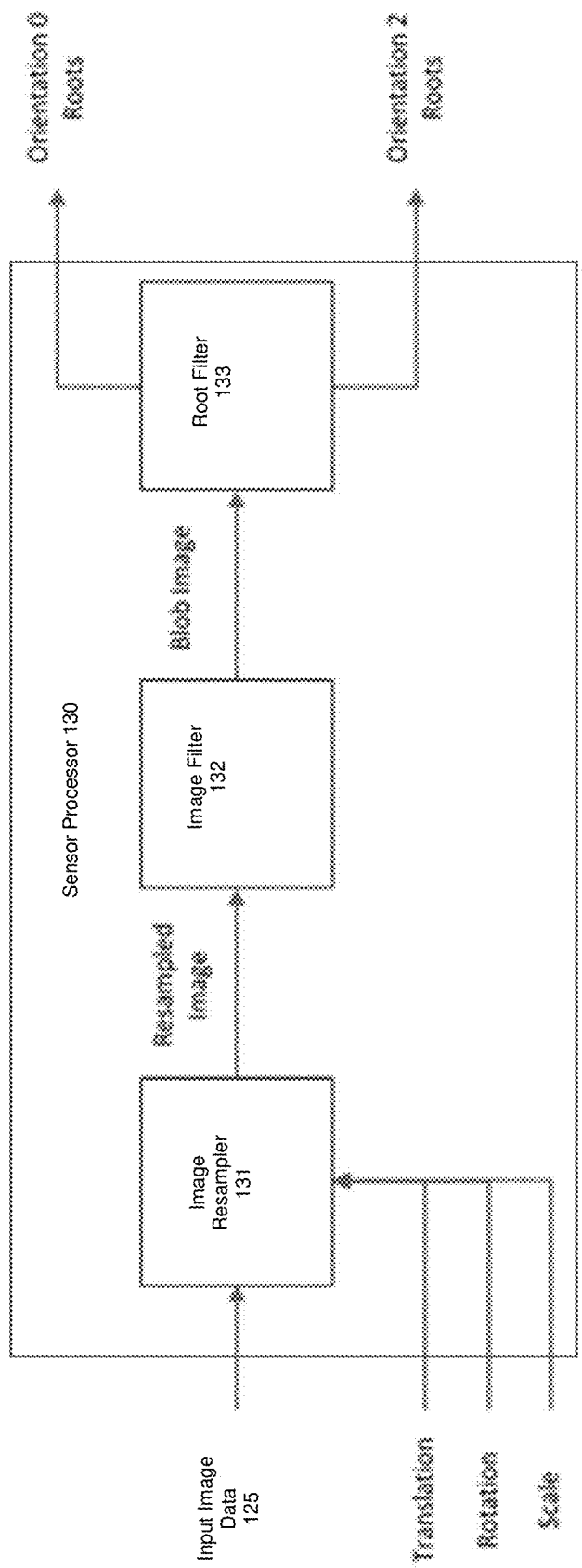
FIG. 3 illustrates components provided in accordance with the disclosed embodiments' sensor processor that may include an image resampler along with an image filter and root filter to exact more precise contours by extracting precise orientation 0 and orientation 2 roots.

As illustrated in FIG. 3, root association may be performed in the sensor processor 130 by inputting image data into an image filter 132 to generate shapelet data 135 that may include blob images, or sparsity images.

Application of the image filter 132 produces/defines root functions and associated dead zones between them. Given the nature of the image data in video, those roots may be identified over time and used to associate roots by generating root velocities and associating roots having the same velocities More specifically, effectively determining roots has particular utility because roots are consistent across frames and roots are dimensionless points that represent an exact place on the image. This is because, roots, are essentially, zero-crossings of contours in a blob image in the image data, wherein orientation 0 roots search for zero-crossings along rows of the blob image and orientation 2 roots search for zero-crossings along columns of the blob image. Zero crossings, or roots, typically occurs between two pixels in a blob image. However, the precise sub-pixel location of the zero crossing, or root, can be interpolated. These characteristics enable movement of objects in captured image data to be determined to a higher degree of accuracy, i.e., sub-pixel, thereby improving the ability to associate identified isolated roots across successive frames in time.

In accordance with various disclosed embodiments, as illustrated in FIG. 3, the sensor processor 130 may include an image resampler 131 along with an image filter 132 and root filter 133 to exact more precise contours by extracting precise orientation 0 and orientation 2 roots.

The image filter 132 may be implemented, for example, via technology disclosed in relation to FIG. 3 of U.S. Pat. Pub. 20180173982, filed Aug. 11, 2017 and entitled "SYS- TEM AND METHOD FOR 1D ROOT ASSOCIATION PROVIDING SPARSITY GUARANTEE IN IMAGE DATA." Likewise, the root filter 133 may be implemented, for example, via technology disclosed in relation to FIG. 6 of that patent application publication.

Appendix A includes an example of one implementation of software code utilized for providing the affine contour filter image functionality.

The sensor processor 130 may be implemented using various solid-state technology including, for example, Complementary Metal-Oxide-Semiconductor (CMOS) implemented technology, e.g., one or more Field Programmable, Gate Arrays (FPGAs), (GPUs) or functionally or structurally similar devices integrated circuits and associated software and/or firmware provided in, for example, Application Specific Integrated Circuits (ASICs).

Input image data 125 may be fed into the image resampler 131 to generated resampled image data, e.g., resampled at 240 frames per second. In accordance with various embodiments, disclosed herein, the operations performed by the image resampler 131 may be altered based on feedback data generated as part of translation, rotation and scale operations discussed herein. This feedback may be particularly useful because image acquisition over a given period of time results in changes in a structural grid that occur over that period of time as objects in the scene move. By referencing the feedback, disclosed embodiments may be able to track objects in the images acquired over the period of time by aligning the structural grids.

Subsequently, that resampled image data may, optionally, be processed to perform an 8-bit to 11-bit image conversion so as to generate higher depth image data at 30 frames per second. Note, it should be understood that such bit conversion is optional for disclosed functionality for contour scale tracking because that functionality may use image data of any depth. However, the bit conversion is particularly useful for long range relative depth tracking functionality, discussed herein, because the higher the depth the more detailed the contours can be at a given noise level. In implementation, the image resampler 131 functionality may be implemented using a texture unit on a Graphics Processing Unit (GPU) or an Artificial Intelligence (AI) chip. In one potential implementation option, the resampler 131 may be constrained to relatively small translations (i.e., less than 2-3 pixels), small rotation angles, and/or small scale changes. In implementing the resampler 131, it should be understood that the implementation preserves the root and contour structure so that generated roots and contours translate, rotate, and scale accurately with transformed resampled image with sub-pixel precision.

Resampling the image data provides improved precision in controlling sub-pixel translation, rotation, and scaling. In implementation, this results a robust system that may be implemented in simple, potentially, hard coded, algorithms which may not require machine learning to enable object identification and tracking. Moreover, the disclosed embodiments may be implemented to provide sub-pixel precision that operates on a GPU chip but may be further optimized for AI chip implementation (thereby affecting data flow and memory footprint considerations for that implementation, including a higher cost of latency, power, and external memory storage).

Disclosed embodiments utilizing this resampling functionality provide a significant deviation from conventional approaches to machine vision because it is much more common to use pixel-based edges (e.g. canny edges) of objects identified in image data for machine vision. However, there is no technical basis or technical utility that would result from using an image resampler for pixel-based edges. To the contrary, as explained above, disclosed embodiments use roots, and more specifically, roots of band-pass filtered of blobs determined based on image intensity in image data.

In accordance with various disclosed embodiments, lateral contour tracking may be performed wherein movement of an object may be tracked within the field of view of a camera by aligning the contours associated with the object in space-time. As a result, a point guaranteed to be on an object to be tracked may be specified in a first image and, thereafter, used to enable providing relative size updates for the object on a periodic basis so as to determine whether the tracked object is appearing larger (thereby indicating a distance between the camera and the object is decreasing) or smaller (thereby indicating a distance between the camera and the object is increasing). In accordance with at least these embodiments, the size and shape of the object to be tracked need not be specified ahead of time. Nevertheless, the position of tracked object may be determined on a sub-pixel basis so as to provide what may be considered to be "stabilized" video image data.

In accordance with at least some disclosed embodiments, the image processing engine provides an improved capability of performing lateral contour tracking functionality. As such, at least these disclosed embodiments provide technical utility in that they provide the ability to track movement of an object within the field of view of a camera by aligning its associated contours in space-time. In accordance with at least these disclosed embodiments, a point (i.e., initial point) guaranteed to be on the object may be specified on a first image included in a plurality of images. Moreover, relative size updates may also be provided periodically indicating whether the object is appearing larger or smaller, thereby indicating scale as well.

Nevertheless, these disclosed embodiments may provide such functionality while not requiring that size and shape of a detected object be specified. This is particularly useful because it enables the ability to analyze edges in a weighted manner beginning from an initial point. In this way, the edges within image data may be weighted with more weight for detected edges closer to the initial point to enable improved precision. Further, in accordance with disclosed embodiments, sub-pixel position of an object point, as it is tracked, may be output to the object signature detector.

Conventionally, the problem of tracking movement of an object has been handled using a number of ineffective approaches. For example, one conventional approach uses optical flow to track regions of constant intensity. However, optical flow methods are not robust, nor efficient for high frame rates. Thus, optical flow based solutions tend to use lower frames to track objects to reduce computation at the cost of more complex algorithms required to deal with missing information. Moreover, optical flow methods do not provide sub-pixel results.

Alternatively, another conventional approach has attempted to use machine learning to recognize an object in each frame of the video. They has also included performing operations to learn how to draw a bounding box around the object. However, machine learning requires massive amounts of labeled data. Additionally, machine learning techniques fail when trying to track objects that have not been seen before. Therefore, the effectiveness for a real world implementation of diverse objects would not be sufficiently supported by such machine learning techniques.

To the contrary, at least some embodiments disclosed herein, track small regions of zero local movement through space and time within the image data generated by one or more sensors. As a result of this tracking, contours may be extracted for each image.

In implementation, the first frame included in the image data may be declared as a "map" and includes "map contours." That map may also store an initial track point, which may be a point in the image data generated as a result of a user tapping or pressing a location on a Graphical User Interface (GUI) displaying image data. Accordingly, it should be understood that this action by a user may trigger selection of the frame of image data currently being displayed as the initial frame for use in generating the map. Likewise, the initial point within that map may be used as the basis for tracking the object at the point in the frame.

Subsequently, contours of each incoming image included in a plurality of frames included in video image data may be aligned to the map contours using tethers so as to enable the ability to track the object initially located at the initial point. A tether is a connection between roots of similar polarity on two different frames. Since roots for a particular orientation have a polarity, for orientation 0, from left to right, an intensity change in the blob image from negative to positive has a positive polarity and from positive to negative has a negative polarity. Likewise, for orientation 2, from top to bottom, an intensity change in the blob image from negative to positive has a positive polarity and from positive to negative has a negative polarity.

Thus, tethers can connect roots of contours from a current frame to the nearest roots on contours of similar polarity in the map frame. Thereafter, a Gaussian weighted average of the tethers may be computed. Subsequently, the incoming image data may then be translated in the direction that minimizes the average tether length. Following that translation, the process operations for generating tethers and translating the image data may be performed on an iterative basis (i.e., repeated) until and acceptable error rate is generated. This is explained in greater detail with relation to FIG. 4.

This approach has particular technical utility as a result of tracking zero local movement in space-time, which is significantly different than conventional approaches that use algorithms that track edges or intensities in space only. In particular, by tracking zero local movement in space-time, the disclosed embodiments do not require prior knowledge about the size or shape of an object. Additionally, disclosed embodiments can provide sub-pixel resolution and accuracy natively and directly based on the image data generated by one or more image sensors. Moreover, the disclosed embodiments do not require any training data in order to enable accurate and efficient operation, thereby increasing the robustness of image processing in a machine vision system. Moreover, this approach enables the ability to use higher frame rates results in simpler computations that can be executed on emerging silicon processing platforms such as GPU and AI chips.

Figure 4:
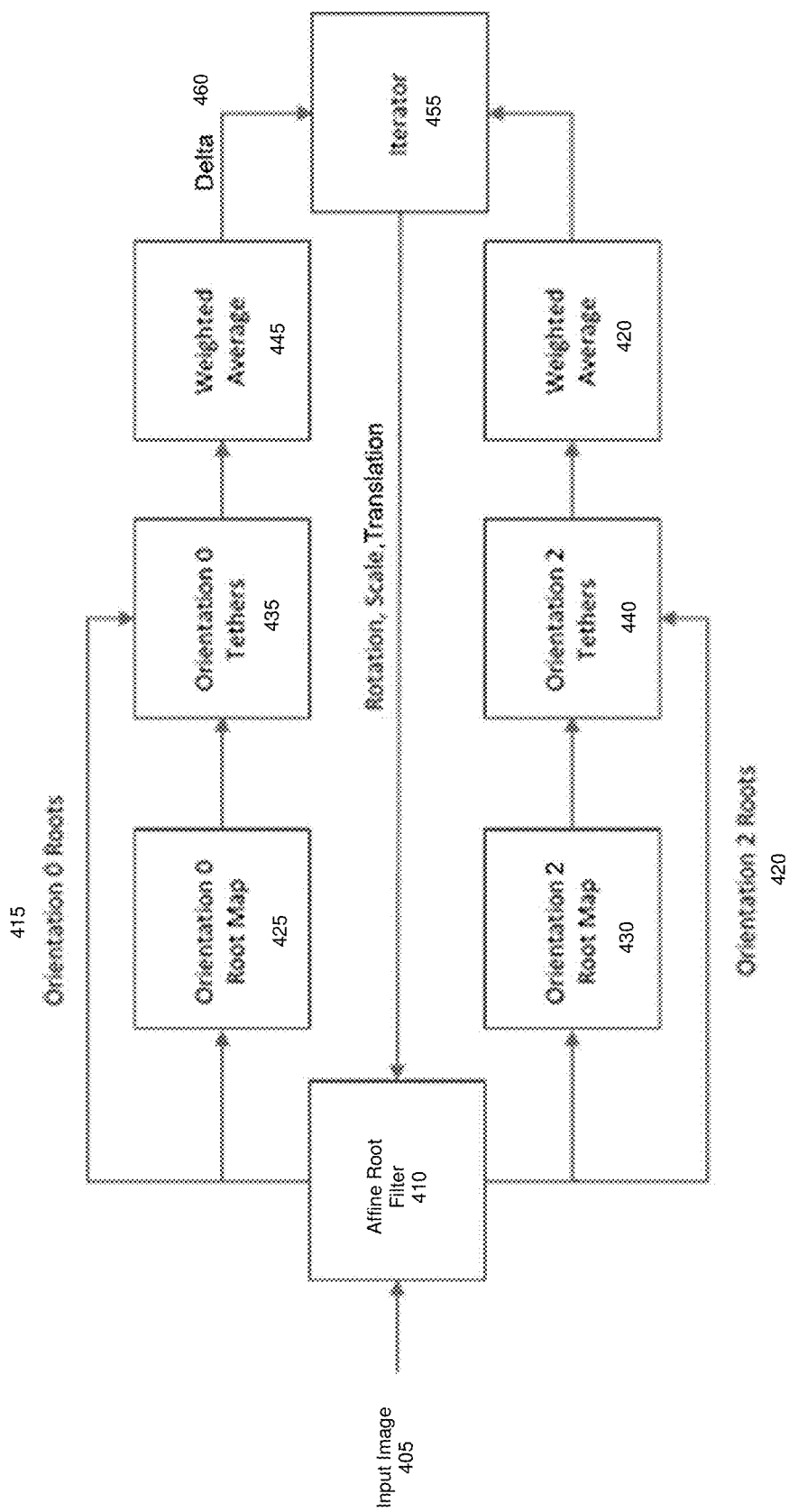
FIGS. 4-8 provide illustrative descriptions for explaining object rotation functionality that enables measurement of the relative range to the tracked object without prior knowledge of the object size or shape, in accordance with the disclosed embodiments.

FIG. 4 illustrates a block diagram of an example of a disclosed embodiment including lateral tracking functionality. As shown in FIG. 4, input image data 405 is first filtered using an affine root filter 410 to generate orientation 0 roots 415 and orientation 2 roots 420. The orientation 0 roots 415 for initial frame are used to generate the orientation 0 root map 425; likewise, the orientation 2 roots 420 for the initial frame are used to generate the orientation 2 root map 430. Additionally, the orientation 0 roots 415 for frames after the initial frame are used to generate orientation 0 tethers 435; likewise, the orientation 2 roots 420 for frames after the initial frame are used to generate the orientation 2 tethers 440. Thereafter, weighted averaging may be performed to generate a delta 460. Thereafter, the process may be repeated by iterating the result 455.

Figure 5:
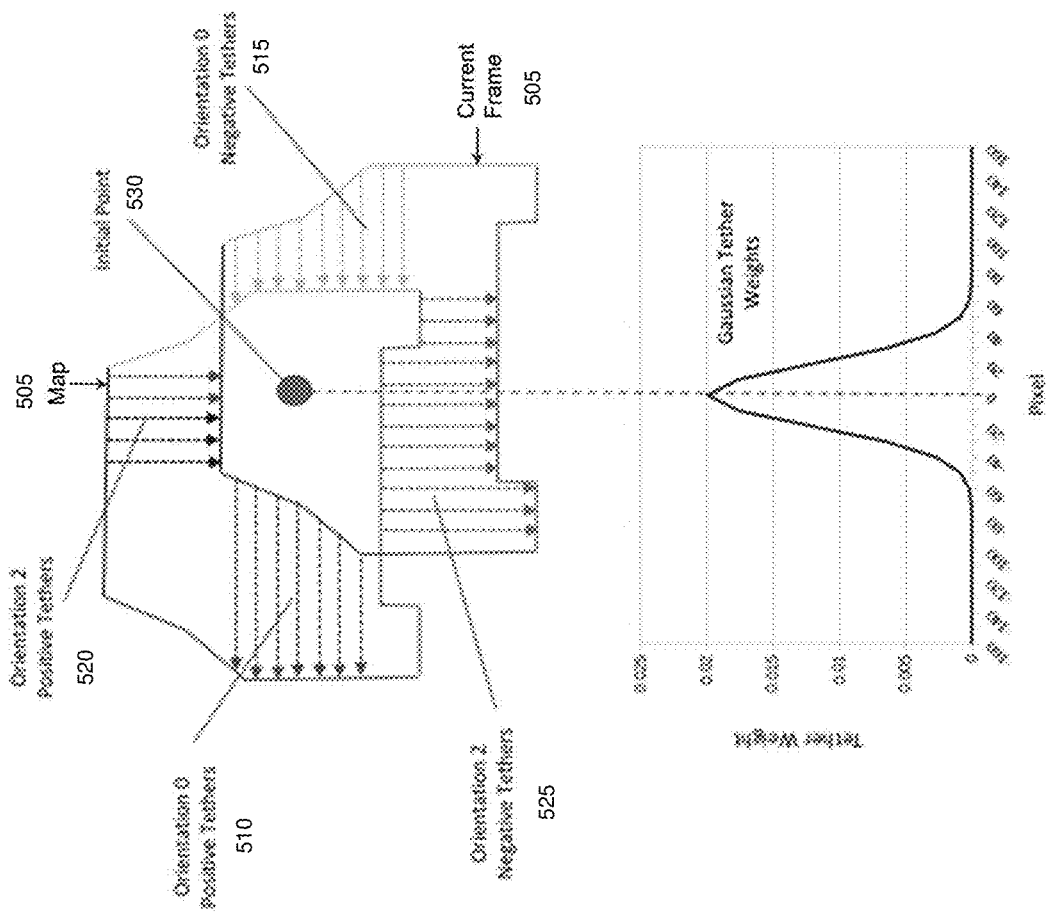

FIG. 5 illustrates an exemplary diagram of orientation 0 and 2 tethers being applied between an incoming frame 505 and a map frame 500. As shown in FIG. 5, the tethers have different polarities. Thus, there are positive tethers 510 for orientation 0 roots and negative tethers 515 for orientation 0 roots. Likewise, there are positive tethers 520 for orientation 2 roots and negative tethers 525 for orientation 2 roots. As noted above, the map may also store the initial track point 530 so as to enable the ability to track the object initially located at that point in subsequent frames of image data. Note, the graph shown below the frame interlay in FIG. 5 provides an example of the Gaussian weights applied to the tethers around the initial point.

Figure 6:
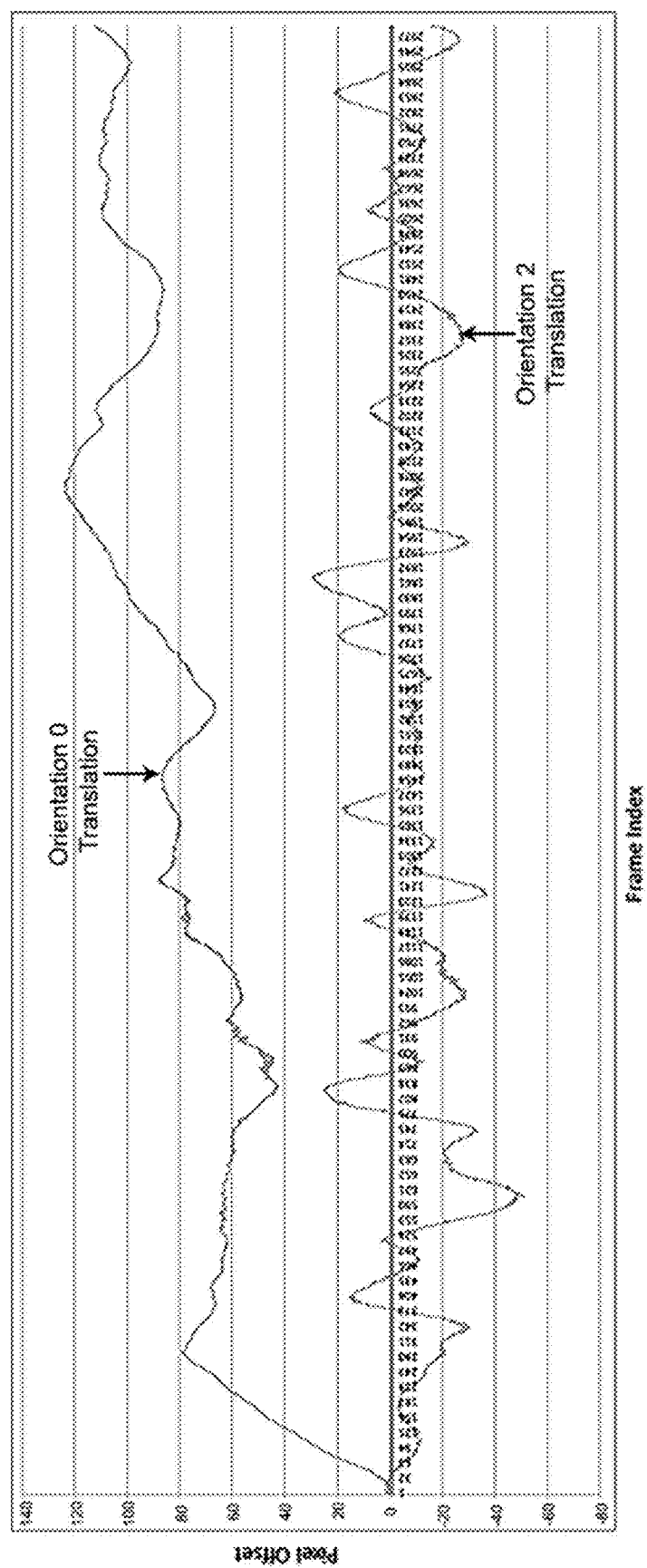

FIG. 6 illustrates a plot of the translations required to align incoming frames to the map frame, wherein the x axis indicates the frame index (the index number of each frame) and the y axis indicates the pixel offset performed. Of note, the pixel offsets for the two orientation roots, 0 and 2, vary independently of each other. From a conceptual standpoint, the pixel offsets can be thought of as the relative ego motion between the image sensor, e.g., camera, that generates the image data and the object being tracked. As a result it should be understood that the alignment of frames resulting from this approach effectively enables the ability to recognize and identify how the camera moves in relation to the tracked object. This is particularly important when both the image sensor and the tracked object are simultaneously moving independent of one another, for example, when the image sensor is a camera mounted on or included in a transportation vehicle on a roadway and the object to be tracked is another transportation vehicle on the roadway.

Figure 8:
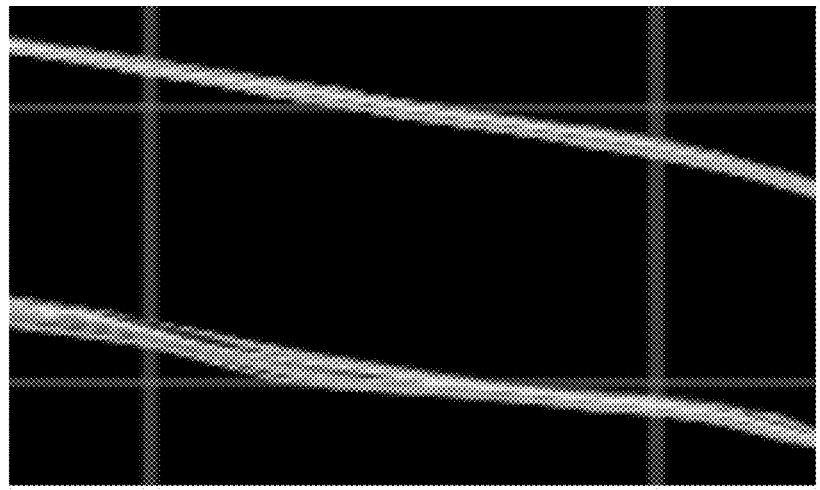
Figure 7:
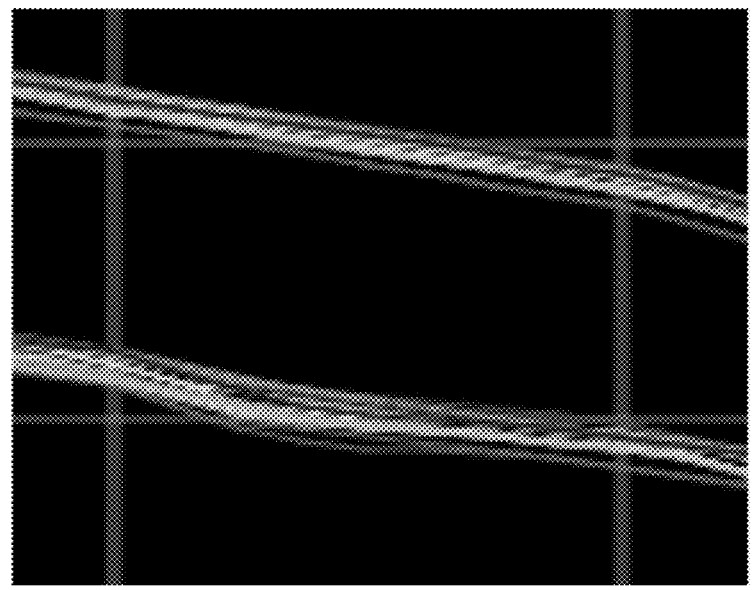

For example, by enabling the alignment of the frames of image data, it is possible to determine and identify local movement, which is movement of an object relative to its background. FIGS. 7 and 8 demonstrate how local movement is restored. FIG. 7 shows contours after alignment on pixel boundaries. As shown in FIG. 7, there is a great deal of variation of the contours because the contours are misaligned because the alignment is constrained to only pixel boundaries, which is not accurate. To the contrary, FIG. 8 (on the right) shows the result after the contours are aligned on sub-pixel boundaries. Comparison of the contours illustrated in FIGS. 7 and 8 indicates the improved accuracy resulting from alignment on sub-pixel boundaries.

Appendix B includes an example of one implementation of software code utilized for lateral movement determination with increased sensitivity based on lateral contour tracking.

In accordance with various embodiments, contour scaled tracking may be performed using such stabilized video data. More specifically, the scale change of contours associated with a tracked object may be measured without prior knowledge of object size or shape.

As such, at least these disclosed embodiments provide technical utility in that they provide the ability to measure a change in scale in object stabilized image data, e.g., video data resulting from performing lateral contour tracking functionality (explained above with relation to FIGS. 4-8). Moreover, at least these disclosed embodiments provide technical utility in that they provide the ability to not only track movement of an object within the field of view of a camera but also to measure the scale change of the contours associated with an object without prior knowledge of the object size or shape.

As explained above, as a result of performing lateral contour tracking, image data includes images that may be centered on an arbitrary point (i.e., the initial point 530 of FIG. 5) guaranteed to be on an object to be tracked. Accordingly, an initial scale of the object in an initial frame (considered to be the "map") may be declared unity. Thereafter, the disclosed embodiments may be utilized to determine and output the relative scale of the object as each subsequent image frame is processed. By measuring and monitoring the change of scale, disclosed embodiments provide the ability to recognize and determine an extent of separation distance between an image sensor, e.g., camera, and the object being tracked.

Conventional approaches to tracking objects in image data such as video data have not provided the ability to detect the relative scale of an object without requiring knowledge of an initial size and/or shape of the tracked object. As a result, such conventional approaches are particularly limited and of no real world use in applications that include diverse and dynamic sets of objects requiring tracking, e.g., for assistive/autonomous driving functionality.

To the contrary, in accordance with disclosed embodiments explained above, image data may be processed to extract contours which may then be aligned to enable centering of the images about a point on the object so as to register the images in an image sequence with one another in association with a tracking point. A contour is simply a set of roots that form a boundary between two blobs in an image. By extracting the contours from each incoming image and comparing them with the contours of the map frame, the disclosed embodiments generate tethers for the contours of each incoming frame.

In accordance with at least some embodiments, the length of these tethers may be aggregated using a large Gabor filter to provide a measurement that indicates change of scale. A Gabor filter performs modulation of a directed sine plane wave and a circular 2D Gaussian function. Thus, such a Gabor filter may be constructed, for example, by modulating a two dimensional Gaussian filter with an in-phase, two dimensional sinusoidal wave in two or more orientations. The output of such a Gabor filter is inversely proportional to scale change while being insensitive to (i.e., not being sensitive to or affected) to translation misalignment.

Disclosed embodiments provide additional technical utility because they provide the ability to detect relative changes in the size of an object in an image without knowing the size in the first place.

Moreover, as a result of this relationship, image data included in a current image may be resampled to increase or decrease the resolution to be slightly larger or smaller to drive the Gabor filter output to zero. This enables object scaling to be performed so as to align edges of the object so that the object in the image data is maintained the same size from image to image. Moreover, because the depth of the object (distance to the object) is inversely proportional to its scale change, this data may be used to determine distance to the object and/or changes in distance to control assistive/autonomous driving functionality of a transportation vehicle, as discussed herein.

As with the other disclosed embodiments, use of the roots for different orientations enables a robust and simplistic machine vision system that does not require machine learning to identify and track objects. Moreover, because of the simplistic nature of the implementation, the functionality may be implemented using a GPU and may be optimized for an AI chip implementation.

Figure 10:
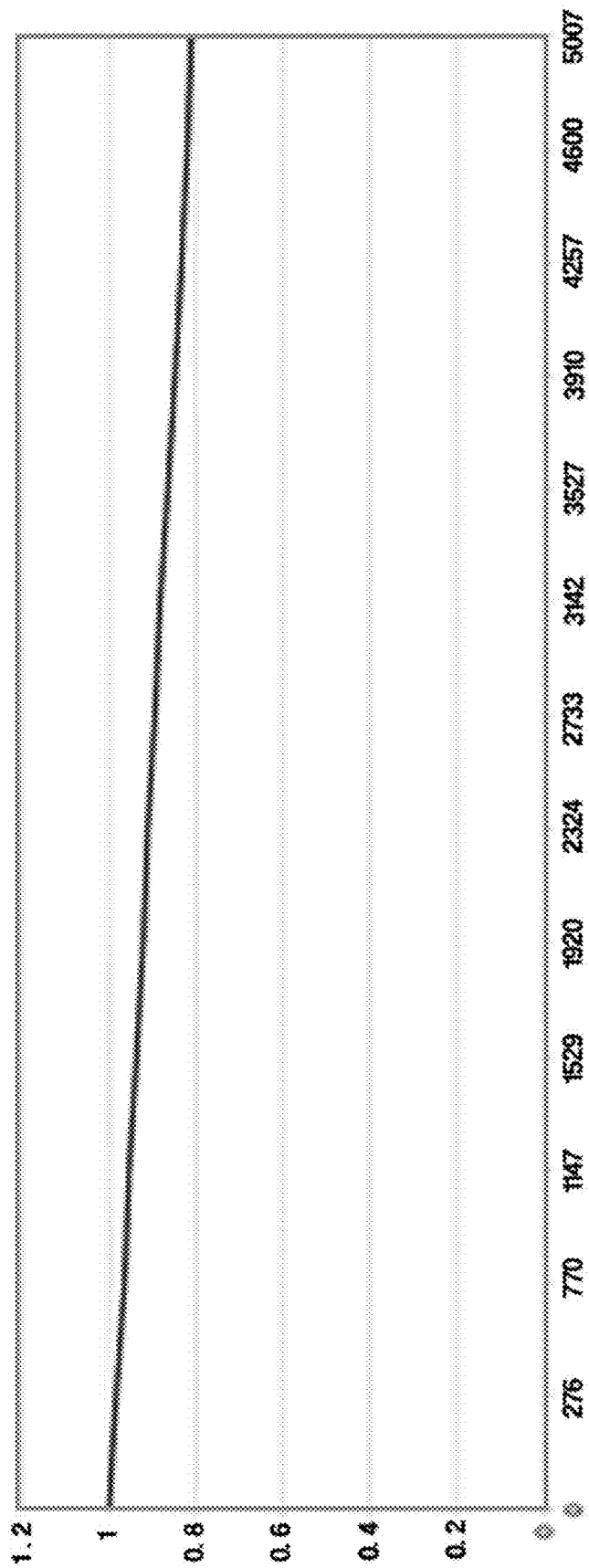

Referring back to FIG. 4, it should be understood that contour scale tracking functionality can be provided utilizing the functionality used for lateral contour tracking. For example, FIG. 9 illustrates an exemplary diagram of orientation 0 tethers 910, 915 and orientation 2 tethers 920, 925 being applied to an incoming frame and a map frame with Gabor weights (as shown in the graph) applied to the tethers around the initial point 930. FIG. 10 illustrates an example of output of the relative scale change graphed as a function of frame number. Appendix C includes an example of one implementation of software code utilized for contour scale tracking.

By tracking the scale change of contours in this way, disclosed embodiments may be implemented to improve the accurate of long range relative depth tracking by measuring the relative size change of an object using the stabilized data provided by the affine contour filter.

In accordance with at least some disclosed embodiments, the image processing engine provides an improved capability of performing long range relative depth tracking functionality. More specifically, the relative depth of an object within the field of view of an image sensor may be tracked at long range by measuring its relative size change, as stabilized relative to the image sensor, as discussed above, without knowledge of the object's actual size or shape. As a result, disclosed embodiments may be utilized to enable image sensor, for example, a mono camera, to track the position, rotation, and/or relative range of an object at operating ranges of LIDAR and radar. Thus, disclosed embodiments enable output of position, rotation, and relative range of the tracked object for each image in an image sequence based on the point guaranteed to be on the object identified in the first frame. As such, at least these disclosed embodiments provide technical utility in that they provide the ability to not only track movement of an object within the field of view of a camera but also to measure the relative range to the tracked object without prior knowledge of the object size or shape.

Conventional Adaptive Cruise Control (ACC) radar algorithms determine a range to a detected object on a roadway, for example, vehicle travelling in a lane of travel in front of a vehicle including ACC radar. However, many conventionally known, ACC radar algorithms triangulate to a ground plane to measure absolute distance. This approach requires a flat level road, extremely accurate camera calibration, precise mounting to a transportation vehicle, and priori knowledge of the size of the car being followed. These limitations result in inaccuracies in such ACC radar systems in implementation.

To the contrary, as least some embodiments disclosed herein perform object translation (explained above with reference to FIGS. 1-3) object rotation (explained above with reference to FIGS. 4-8) and object scaling (as explained above with reference to FIGS. 9-10) to enable measurement of the relative range to the tracked object without prior knowledge of the object size or shape.

More specifically, the object translation functionality may be used to resample images to center the object about an initial object point in each frame. Subsequently, object rotation functionality is used to align the object to remove rotation along the optical axis. Additionally, object scaling may be performed to align edges of the object so that the object is maintained the same size from image to image. As a result of these operations, the object scale may be fed back into the object translate loop so as to enable a proportional adjustment of the size of the root extract filter to maintain the same edge pattern.

The object rotation functionality stabilizes the images in the image sequence to stabilize an object being tracked in that image sequence, for example, a transportation vehicle being followed. An image integrator is used to increase sensitivity; thereafter scale tracking functionality is used to measure relative size.

Figure 11:
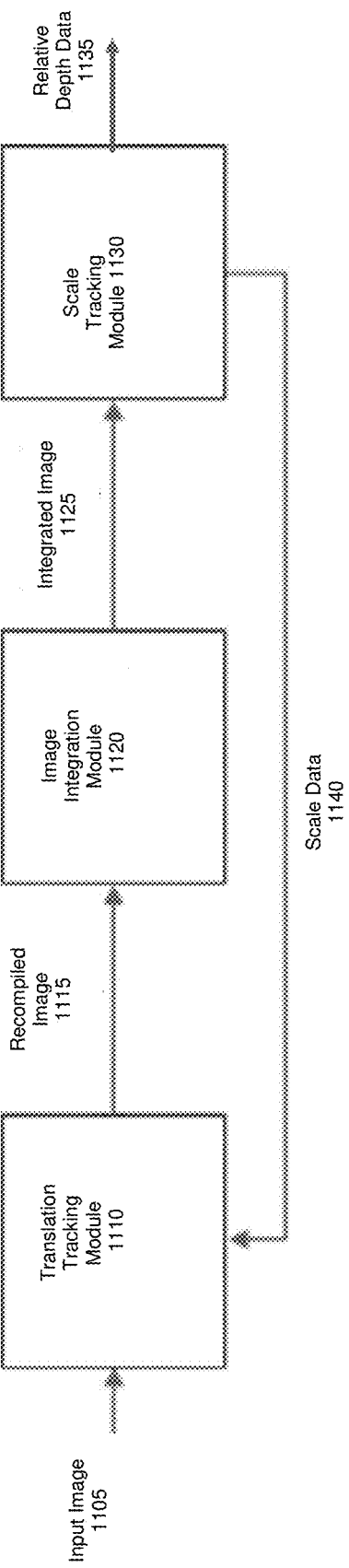
FIG. 11 illustrates operations performed on input image data to perform object translation functionality and resample images to center the object about an initial object point in each frame to generate recompiled image data.

Thus, as illustrated in FIG. 11, input image data 1105 is analyzed to perform object translation functionality at 1110 to resample images to center the object about an initial object point in each frame to generate recompiled image data 1115. That data is then output to an image integrator 1120, which trades temporal resolution for increasing the bit depth of the image data. By increasing the bit depth of the integrated image data 1125, smaller sigmas may be applied thereby enabling higher resolution contours to be obtained for use by the scale tracker functionality applied to the integrated image data 1125 at 1130.

By feeding the scale data back into the object translation functionality at 1110, the affine root filter sigmas may also be scaled to improve accuracy. As a result, contours about the initial point may be stabilized.

Figures 12, 13:
FIG. 12 illustrates an example of image data generated by an image sensor including both an object, e.g., a transportation vehicle, being followed but also the peripheral area around that object which includes additional lanes of traffic in accordance with disclosed embodiments.
FIG. 13 illustrates an example of a fovea, or center of the field of vision, which is focused on an object for improved object tracking in accordance with disclosed embodiments.

Thus, in accordance with these embodiments, mono camera based ACC may be provided in an improved manner. FIG. 12 illustrates an example of image data generated by an image sensor including both an object, e.g., a transportation vehicle, being followed but also the peripheral area around that object which includes additional lanes of traffic. FIG. 13 illustrates the fovea, or center of the field of vision, which is focused on the object, as indicated by crow hairs 1305.

Figure 14:
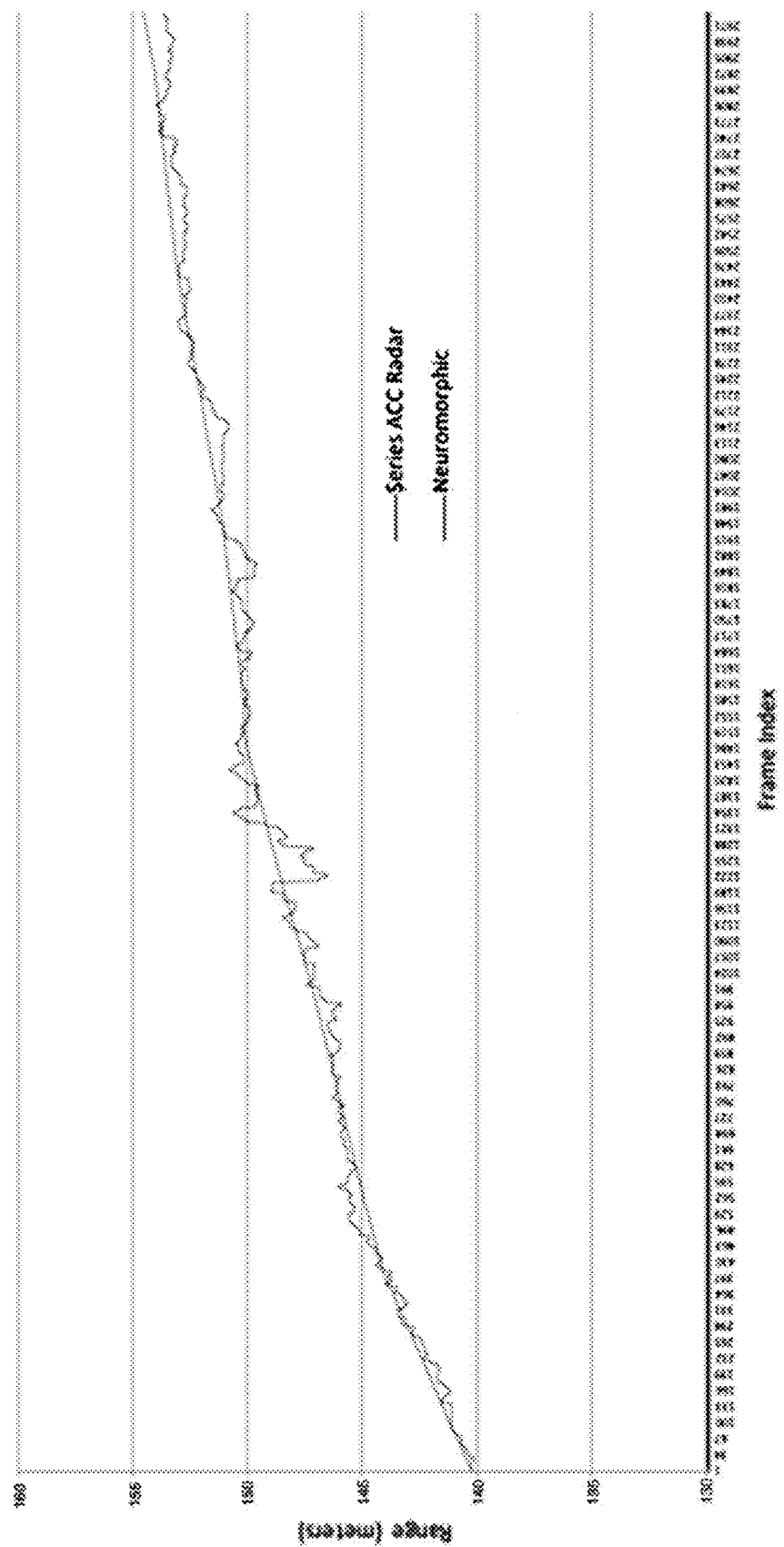
FIG. 14 illustrates an example of a range measurement determination (measured in meters indicated on the y axis) determined over an image sequence denoted by frame numbers in the frame index (x axis) in accordance with disclosed embodiments.

Using a single ACC radar measurement, the disclosed embodiments can convert the relative depth output by scale tracker in FIG. 11 to an absolute range measurement. FIG. 14 illustrates a range measurement determination (measured in meters indicated on the y axis) determined over an image sequence denoted by frame numbers in the frame index (x axis). As shown in that figure, the range determined in accordance with the disclosed embodiments closely correlated the range determined by Series ACC radar.

Appendix D includes an example of one implementation of software code utilized for long range relative depth tracking.

Moreover, in accordance with various disclosed embodiments, contours associated with an object being tracked using this long range relative depth tracking may be identified and associated with the tracked object to further improve accuracy.

In accordance with at least some disclosed embodiments, the image processing engine provides an improved capability of performing long range relative depth tracking functionality by performing local movement segmentation. More specifically, the accuracy of tracking the relative depth of a detected object within the field of view of an image sensor, as discussed above, may be further improved by further improving the ability to identify contours associated with a tracked object to more accurately determine a relative depth of the object in the scene. This, in turn, improves the ability to calculate an absolute range measurement for use in controlling assistive/adaptive driving functionality for a transportation vehicle.

As discussed above, conventional machine vision technologies have used various approaches, for example, optical flow or machine learning for object detection. However, the above-described limitations of those technologies effectively limit their implementation for assistive/autonomous driving functionality.

To the contrary, in accordance with at least some disclosed embodiments, contours associated with a tracked object positioned about an initial tracking point may be stabilized in lateral directions and scale (or relative depth) and local movement segmentation may be performed to further improve object tracking accuracy.

More specifically, as explained above, tethers may be used to connect roots of contours from a current frame to roots on contours of the map frame. By computing the mean and standard deviation for each map root, it can be confirmed that all roots associated with an object across time are close to the map root. As a result, their local movement trajectories may be vertical straight lines in space-time. Thus, the mean and standard deviation of the tethers associated with each map root may be small and limited to less than predetermined thresholds set for this purpose.

Accordingly, as roots are associated with an object being tracked, the roots may be removed from the map leaving only non-zero coherent movement and incoherent movement. As a result, this technique enables the ability to ignore image data that is not necessary to provide high accuracy object tracking. Moreover, optionally, a probability of object existence can be maintained and fed back for use in long range relative depth tracking to provide higher tracking accuracy.

Performing local movement segmentation in this way is particularly robust due to extreme averaging. Moreover, this implementation for performing object tracking may also be less susceptible to non-zero coherent movement caused by shadows and other objects.

In accordance with at least this disclosed embodiment, object tracking may be performed that provides the ability to discriminate based on minuscule differences between local movement trajectories, which was not possible before because there was no effective way to perform segmentation in a robust and accurate manner.

Figure 15:
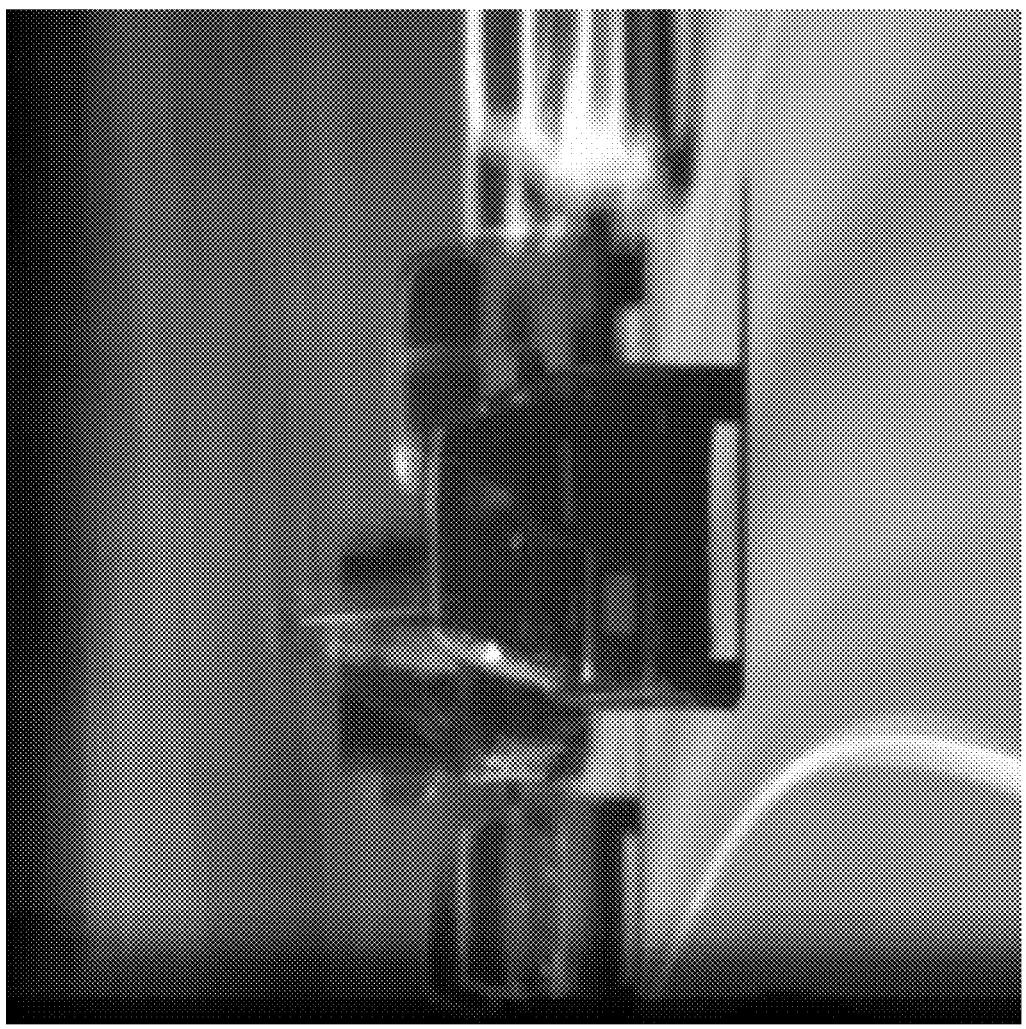
FIG. 15 illustrates an integrated image that provides an example of a transportation vehicle being tracked in accordance with the disclosed embodiments.
Figure 16:
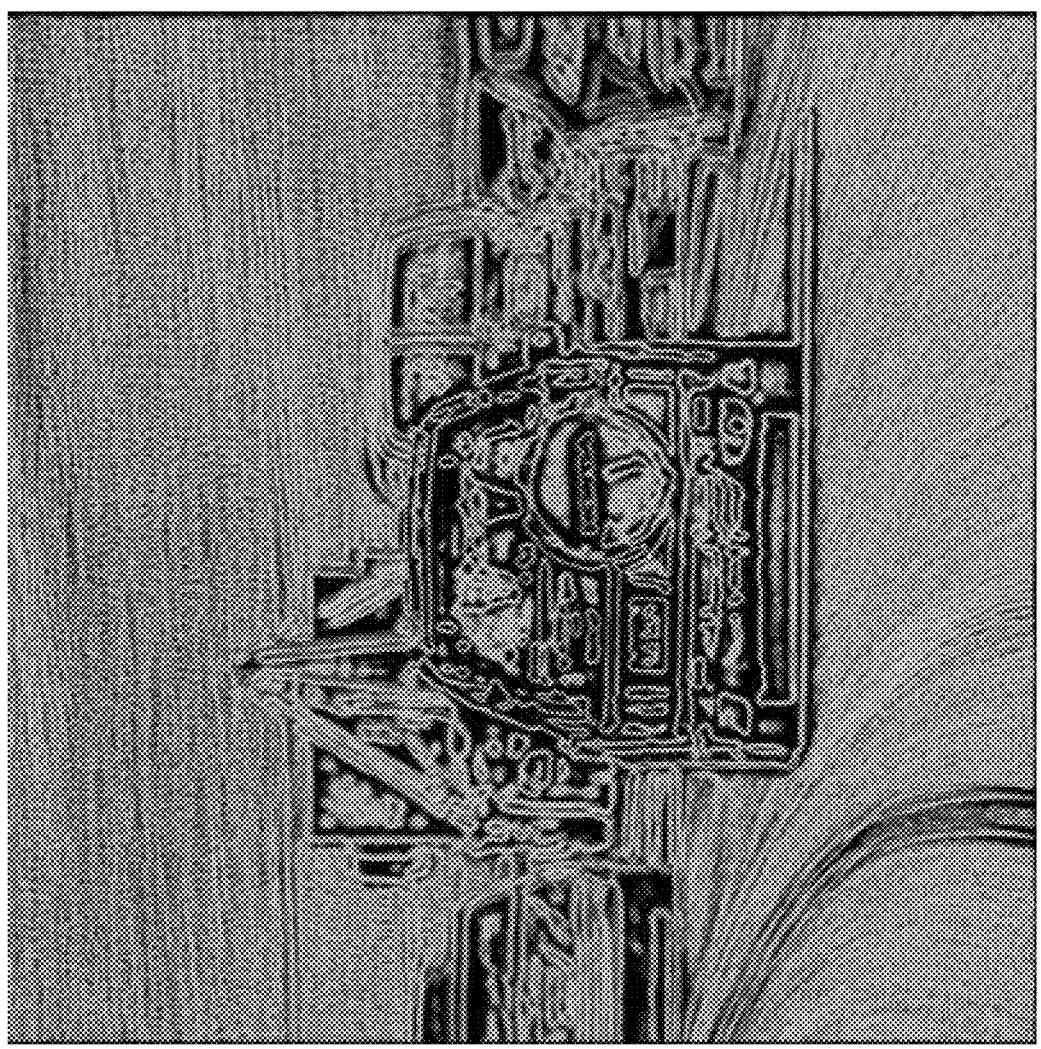
FIG. 16 illustrates an example of how segmentation contours of frames of video image data may be stacked in space-time in accordance with disclosed embodiments to depict local movement of objects in a scene by their contours.
Figure 17:
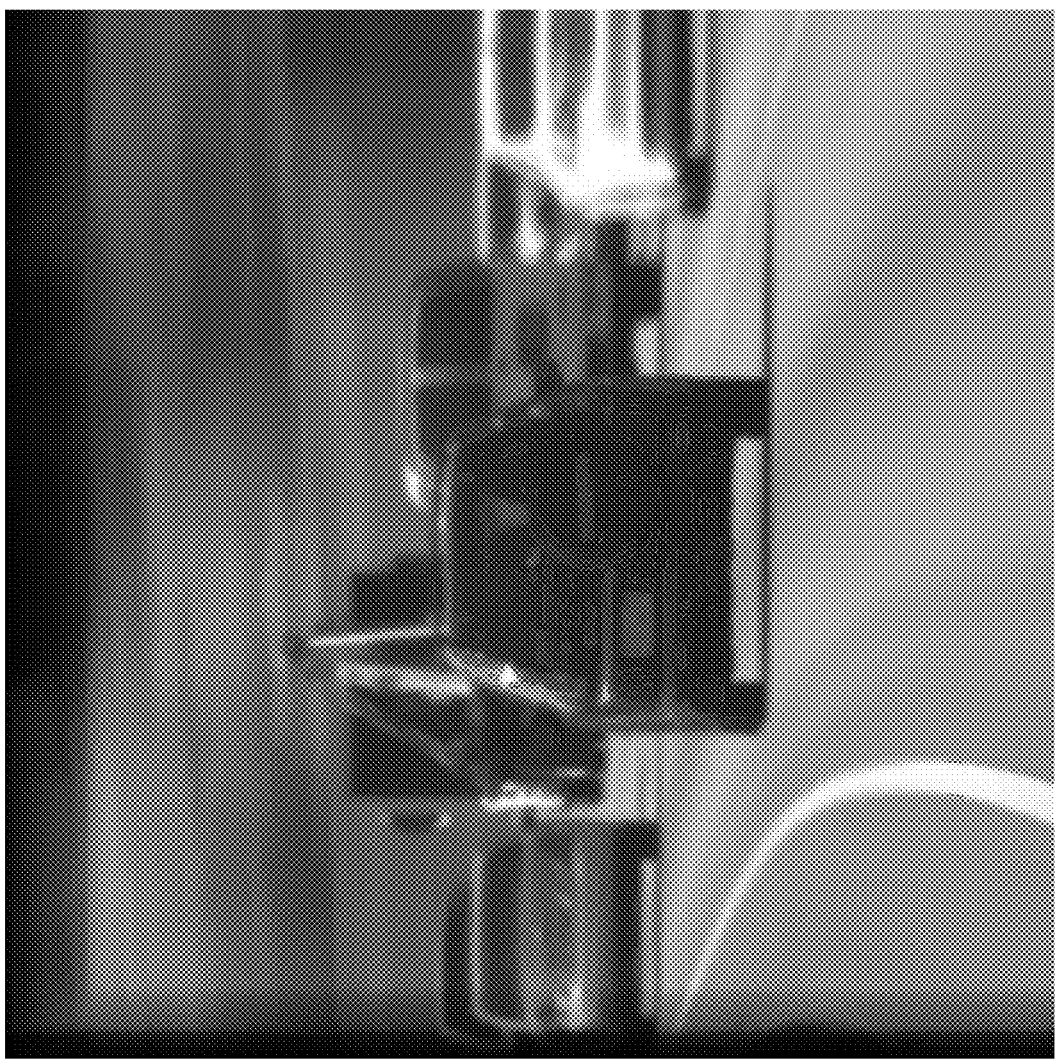
FIG. 17 illustrates an example of segmented contours overlaid on an integrated image to produce an improved, less blurry representation of the object in an image when compared with the integrated image itself.

FIG. 15 is an integrated image 1500 that provides an example of an object 1505, here, a transportation vehicle, being tracked. As shown in FIG. 16, in this example, segmentation contours of 240 frames of video image data were stacked in space-time. Note, local movement of the objects in the scene are depicted by their contours. As shown in FIG. 17, the segmented contours may be overlaid on the integrated image which results in an improved, less blurry representation of the object 1505 in the image 1500 when compared with the integrated image 1500.

Figure 18:
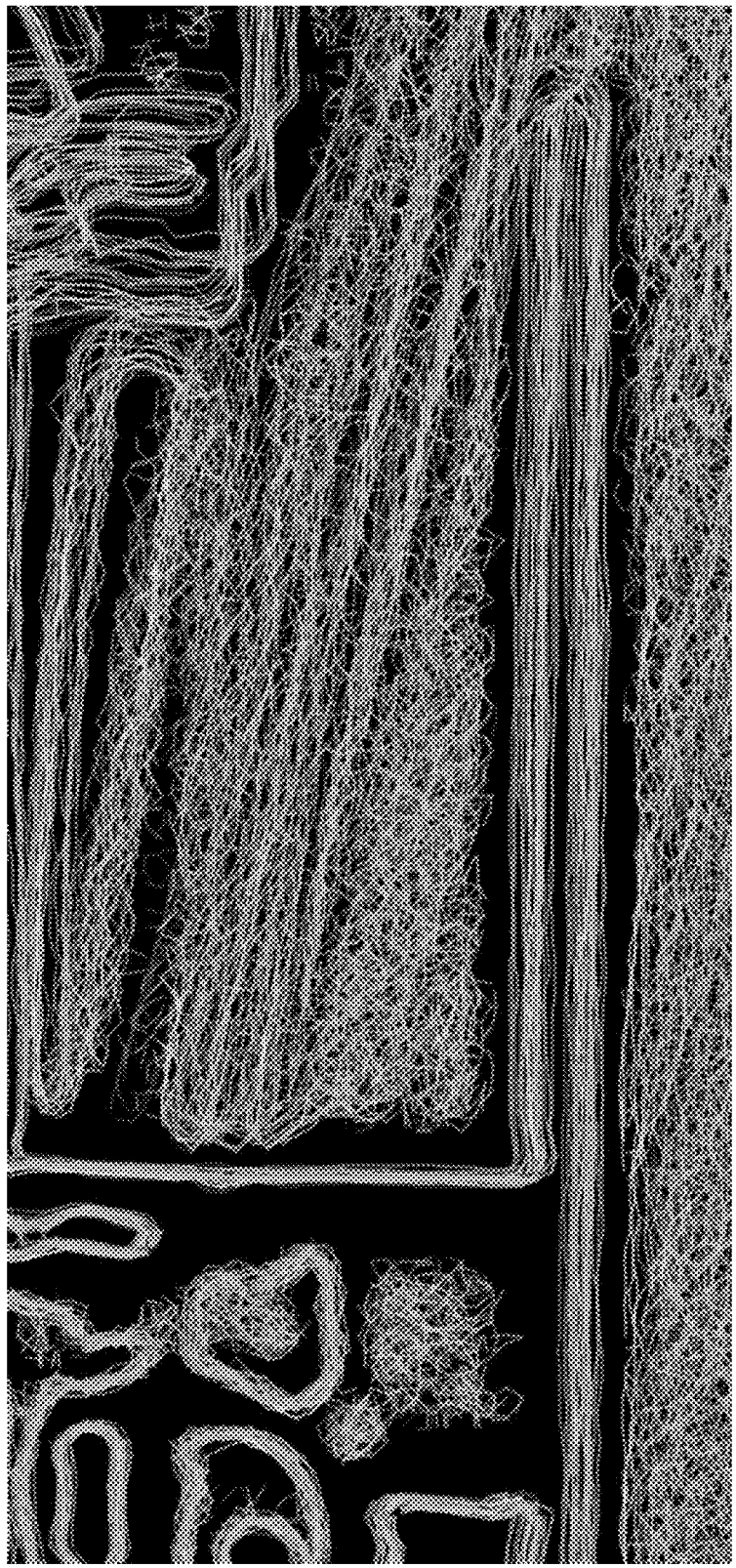
FIG. 18 provides an illustration that provides an enlarged image of the shadow of a vehicle being followed on a roadway and illustrating how the shadow representation has a different local trajectory pattern than the vehicle and a different local trajectory pattern than the road beneath the vehicle.

Further, as illustrated in FIG. 18, provides an illustration that provides an enlarged image, e.g., a close up, of the shadow 1510 of the vehicle 1505 being followed. Note, the shadow representation 1510 has a different local trajectory pattern than the vehicle and a different local trajectory pattern than the road beneath the vehicle. As a result, the image data corresponding to the shadow 1510 can be easily segmented out from the image data corresponding to vehicle 1510 itself.

In accordance with various embodiments, rotation of such image data may also be provided to identify relative rotational movement between a camera and a tracked object to reduce or eliminate the effect of such movement. Appendix E includes an example of one implementation of software code utilized for identifying relative rotational movement utilizing lateral movement determination with increased sensitivity base on lateral contour tracking.

In accordance with at least some disclosed embodiments, the disclosed embodiments may be used to obtain image data and analyze that image data to improve operation, assistance, control and/or analysis of image data in vehicle driving scenarios, for example, but not limited to those used in driver assist functionality, automated/autonomous driving functionality, and the like.

Indeed, conventional image processing, object detection, classification, and tracking are the most challenging tasks in assisted and autonomous driving especially in bad environments, bad lighting conditions, and low false positive/negative rates. Disclosed embodiments enable an increase in the speed, robustness and effectiveness in image processing by reducing extraneous data previously necessary to perform object detection, classification and tracking. Additional utility is provided as well including image data compression, deep learning capabilities with machine learning.

The large quantity of data not only causes storage challenges but also challenges regarding processor capabilities for analyzing such data in an effective manner. Such a large amount of generated data is not useful for driver assistance or autonomous driving applications if the data cannot be analyzed in a timely manner to provide direction and/or control.

Disclosed embodiments may be implemented in conjunction with components of autonomous driving systems and driver assistance systems included in automotive vehicles. Thus, the utility of the disclosed embodiments within those technical contexts is described in detail. However, the scope of the innovative concepts disclosed herein is not limited to those technical contexts. Therefore, it should be understood that the disclosed embodiments provide utility in all aspects of image processing and control, analysis and diagnostic systems utilizing image processing, including but not limited to implementation with additional technology for controlling operation of a transportation vehicle for, e.g., Adaptive Cruise Control (ACC), Augmented or Virtual Reality, control of robotics or drones or any other industrial application that requires tracking of a moving object, particularly, such tracking when it is performed by a sensor on a moving object.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

APPENDIX A

// This code implements Fig. 3 affine filter 130: image resampler 131, image_filter 132, root_filter 133.

```
void image_resampler (Image inputImage,
            float colTrans, float rowTrans, float angle, float scale,
            Image resampledImage) { int rows = inputImage.rows() ;
  int cols = inputImage.cols() ;

for (int row = 0 ; row < rows ; row++) {
     for (int col = 0 ; col < cols ; col++) { float u = float(col) / float(cols) ;
        float v = float(row) / float(rows) ;

u -= 0.5 ;
        v -= 0.5 ;

v *= scale ;
        v *= scale ;

float tu = u * cos(angle) - v * sin(angle) + 0.5 ;
        float tv = v * cos(angle) + u * sin(angle) + 0.5 ;

tu += colTrans / float(cols) ;
        tv += rowTrans / float(rows) ;

float pelF = sample2D(inputImage, tu, tv) ;

resampledImage.set(row, col, pelF) ;
     }
  }
} void image_filter(Image resampledImage,
            float innerSigma, float outerSigma, int filerSize,
            Image blobImage) {

Image innerBlur = blurImage(resampledImage, innerSigma, filerSize) ;
  Image outerBlur = blurImage(resampledImage, outerSigma, filerSize) ;
  blobImage = innerBlur - outerBlur ;
}
```

```
void root_filter(Image blobImage, Image rootImage0, Image rootImage2) { float ROOT_SUBF = 32.0f ; // number of sub-pixels per pixel
   uint8_t ROOT_SUB_MASK = 0x1F ;
   uint8_t ROOT_ROOT = 0x80 ;
   uint8_t ROOT_POLARITY = 0x40 ;

for (row = 0 ; row < rows-1 ; row++) {
      for (col = 0 ; col < cols-1 ; col++) { float aa = blobImage.get(row, col) ;
         float bb = blobImage.get(row, col+1) ;
         float cc = blobImage.get(row+1, col) ;

{
            uint8_t root0 = 0 ;

uint8_t offset = ((aa/(aa-bb))*ROOT_SUBF)&ROOT_SUB_MASK ;
            if ((aa < 0.0) && (bb > 0.0)) {
               root0 = ROOT_ROOT | ROOT_POLARITY | offset ;
            }
            else if ((aa > 0.0) && (bb < 0.0)) {
               root0 = ROOT_ROOT | offset ;
            }
            else if (aa > 0.0) {
               root0 = ROOT_POLARITY ;
            } rootImage0.set(row, col, root0) ;
         }
         {
            uint8_t root2 = 0 ;

uint8_t offset = ((aa/(aa-cc))*ROOT_SUBF)&ROOT_SUB_MASK ;
            if ((aa < 0.0) && (cc > 0.0)) {
               root2 = ROOT_ROOT | ROOT_POLARITY | offset ;
            }
            else if ((aa > 0.0) && (cc < 0.0)) {
               root2 = ROOT_ROOT | offset ;
            }
            else if (aa > 0.0) {
               root2 = ROOT_POLARITY ;
            }
```

```
            rootImage2.set(col, row, root2) ;
        }
      }
    }

} void affine_filter (Image inputImage,
            float colTrans, float rowTrans, float angle, float scale,
            float innerSigma, float outerSigma, int filerSize,
            Image rootImage0, Image rootImage2) { int rows = inputImage.rows() ;
    int cols = inputImage.cols() ;

Image resampledImage(rows, cols) ;
    Image blobImage(rows, cols) ;

image_resampler(inputImage,
            colTrans, rowTrans, angle, scale,
            resampledImage) ;

image_filter(resampledImage,
            innerSigma, outerSigma, filterSize,
            blobImage) ;

root_filter(blobImage, rootImage0, rootImage2) ;
}
```

APPENDIX B

// Implements lateral filter (Fig. 4) using blocks: affine filter (Appendix A), tether filter 435, 440, and lateral weighted average 445, 420. The iterator (455) is implemented in lateral filter.

```
Image rootImageMap0 (rows, cols) ;
Image rootImageMap2 (cols, rows) ;

int TETHER_DELTA = 64 ;

void tether_filter (Image rootImageA, Image rootImageB, Image tetherImage) {
   int rows = rootImageA.rows() ;
   int cols = rootImageA.cols() ;

for (int row = 0 ; row < rows- ; row++) {
      for (int col = 0 ; col < cols- ; col++) {
         uint8_t rootA = rootImageA.get(row, col) ;

int16_t tether = NO_TETHER ;
         if (rootA & ROOT_ROOT) {
            for (int dc = 0 ; dc < TETHER_DELTA ; dc++) {
               if (doR) { // A is to the left of B int colB = col + dc ;
                  if (colB < rootCols) {
                     uint8_t rootB = rootImageB.get(row+1, colB) ;
                     uint8_t rootC = rootImageB.get(row,colB) ;

if (dc == 0) { // ignore if C is A
                        rootC = 0 ;
                     } if (rootC & ROOT_ROOT) {
                        doR = false ;
                     }
                     else
                        if (rootB & ROOT_ROOT) { if ((rootB & ROOT_POLARITY) ^ (rootA & ROOT_POLARITY)) {
                              doR = false ;
                           }
                           else if ((rootA & ROOT_POLARITY) == (rootB & ROOT_POLARITY))
{
                              int16_t dA = int(rootA&ROOT_SUB_MASK) ;
                              int16_t dB = int(rootB&ROOT_SUB_MASK) ;
```

```
                    tether = dc*ROOT_SUBI + dB - dA ;
                    doL = false ;
                    doR = false ;
                    break ;
                }
            }

}
    }
    if (doL) {  // A is to the right of B.
        int colB = col - dc ;
        if (colB >= 0) {
            uint8_t rootB = rootImageB.get(row+1,colB) ;
            uint8_t rootC = rootImageB(row,colB) ;

if (dc == 0) {
                rootC = 0 ;
            }
            if (rootC & ROOT_ROOT) {
                doL = false ;
            }
            else
                if (rootB & ROOT_ROOT) { if ((rootB & ROOT_POLARITY) ^ (rootA & ROOT_POLARITY)) {
                        doL = false ;
                    }
                    else if ((rootA & ROOT_POLARITY) == (rootB & ROOT_POLARITY))
{
                        int16_t dA = int(rootA&ROOT_SUB_MASK) ;
                        int16_t dB = int(rootB&ROOT_SUB_MASK) ;
                        tether = -dc*ROOT_SUBI + dB - dA ;
                        doR = false ;
                        doL = false ;
                        break ;
                    }
                }

}
    }
    if (!doR && !doL) {
        break ;
    }
        }
    }
}
gpuTether.set(row, col, tether) ;
```

```
        }
    }
} float lateral_weighted_average (Image tetherImage, float centerRow, float centerCol, float
sigma, int rateThreshold) { int rows = tetherImage.rows() ;
    int cols = tetherImage.cols() ;

float sum = 0.0 ;
    float count = 0.0 ;

for (int row = 0 ; row < rows ; row++) {
        for (int col = 0 ; col < cols ; col++) { int rate = tetherImage.get(row, col) ;
            if (rate != NO_TETHER) { float drow = float(row) - centerRow ;
                float dcol = float(col) - centerCol ;
                float d = drow*drow + dcol+dcol ;

if ((rate > -rateThreshold) && (rate < rateThreshold)) {
                    float weight = exp(-d/(2.0*sigma*sigma)) / (ROOT_TWOPI * sigma) ;

float sumV = float(rate)/ROOT_SUBF * weight ;
                    float countV = weight ;

sum += sumV ;
                    count += countV ;
                }
            }
        }
    }
    return sum / count ;
} void lateral_filter(Image inputImage,
            float colTrans, float rowTrans, float angle, float scale,
            float innerSigma, float outerSigma, int filerSize,
            ) { if (start) {
```

```
      affine_filter(inputImage, colTrans, rowTrans, angle, scale, innerSigma, outerSigma,
filterSize, rootIImageMap0, rootImageMap2) ;
      start = false ;
   }
   else {
      Image rootImage0 (rows, cols) ;
      Image rootImage2 (rols, rows) ;
      Image tetherImage0 (rows, cols) ;
      Image tetherImage2 (cols, rows) ;

for (int loop = 0 ; loop < maxLoops ; loop++) { affine_filter(inputImage, colTrans, rowTrans, angle, scale, innerSigma, outerSigma,
filterSize, rootImage0, rootImage2) ;

tether_filter(rootImageMap0, rootImage, tetherImage0) ;
         tether_filter(rootImageMap2, rootImage, tetherImage2) ;

float deltaRow = lateral_weighted_average(tetherImage2, colTrans, rowTrans,
tetherSigma, rateThreshold) ;
         float deltaCol = lateral_weighted_average(tetherImage0, rowTrans, colTrans,
tetherSigma, rateThreshold) ;

rowTrans += gain*deltaRow ;
         colTrans += gain*deltaCol ;

if ((abs(deltaRow) < residualThreshold) && (abs(deltaCol) < residualThreshold)) {
            break ;
         }
      }
   }
}
```

APPENDIX C

// Implements functionality provided in Fig. 4 except with variations for scaling instead of lateral movement.

```
float scale_weighted_average (Image tetherImage, float centerRow, float centerCol, float rowScale, float colScale, float sigma, int rateThreshold) { int rows = tetherImage.rows() ;
   int cols = tetherImage.cols() ;

float sum = 0.0 ;
   float count = 0.0 ;

for (int row = 0 ; row < rows ; row++) {
      for (int col = 0 ; col < cols ; col++) { int rate = tetherImage.get(row, col) ;
         if (rate != NO_TETHER) { float drow = float(row) - centerRow ;
            float dcol = float(col) - centerCol ;
            float d = drow*drow + dcol+dcol ;

if ((rate > -rateThreshold) && (rate < rateThreshold)) {
               float weight = exp(-d/(2.0*sigma*sigma)) / (ROOT_TWOPI * sigma) ;

float angle = dcol / 100.0 * PI ;
               weight = weight * sin(angle) ;

float sumV = float(rate)/ROOT_SUBF * weight ;
               float countV = abs(weight) ;

sum += sumV ;
               count += countV ;
            }
         }
      }
   }
   return sum / count ;
} void scale_filter(Input inputImage) { if (start) {
```

```
      affine_filter(inputImage, colTrans, rowTrans, angle, scale, innerSigma, outerSigma,
filterSize, rootIImageMap0, rootImageMap2) ;
      start = false ;
   }
   else {
      Image rootImage0 (rows, cols) ;
      Image rootImage2 (rols, rows) ;
      Image tetherImage0 (rows, cols) ;
      Image tetherImage2 (cols, rows) ;

for (direction = 0 ; direction < 2 ; direction++) {
         if (direction == 0) {
            gain = deltaGain ;
         }
         else {
            gain = 1.0/deltaGain ;
         }
         for (int loop = 0 ; loop < maxLoops ; loop++) { affine_filter(inputImage, colTrans, rowTrans, angle, scale, innerSigma, outerSigma,
filterSize, rootImage0, rootImage2) ;

tether_filter(rootImageMap0, rootImage, tetherImage0) ;
            tether_filter(rootImageMap2, rootImage, tetherImage2) ;

float rowResidual = scale_weighted_average(tetherImage2, colTrans, rowTrans,
colScale, rowScale, tetherSigma, rateThreshold) ;
            float colResidual = scale_weighted_average(tetherImage0, rowTrans, colTrans,
rowScale, colScale, tetherSigma, rateThreshold) ;
            float scaleResidual = min(abs(rowResidual), abs(colResidual)) ;

if (scaleResidual < scaleResidualThreshold) {
               break ;
            }
            colScale *= gain ;
            rowScale *= gain ;
         }
      }
   }

}
```

APPENDIX D

```
// Implements functionality of Fig. 11 using blocks lateral filter (Appendix B) and scaling filter
(Appendix C).

Image integratedImage (rows, cols) ;

void car_following (Image inputImage) { int rows = inputImage.rows() ;
   int cols = inputImage.cols() ;

Image resampledImage (rows, cols) ;

float scale = 1.0 ;

lateral_filter(inputImage, colTrans, rowTrans, angle, scale, innerSigma, outerSigma, filterSize,
resampledImage) ;

integrateImage (resampledImage, integratedImage) ;

if (frameIndex % frameCount) {
      scale_filter(integratedImage, scale) ;
   }
}
```

APPENDIX E

// Implements use of blocks lateral filter (Appendix B) to accomodate rotation.

```
float rotation_weighted_average (Image tetherImage, float centerRow, float centerCol, float
rowScale, float colScale, float sigma, int rateThreshold) { int rows = tetherImage.rows() ;
   int cols = tetherImage.cols() ;

float sum = 0.0 ;
   float count = 0.0 ;

for (int row = 0 ; row < rows ; row++) {
      for (int col = 0 ; col < cols ; col++) { int rate = tetherImage.get(row, col) ;
         if (rate != NO_TETHER) { float drow = float(row) - centerRow ;
            float dcol = float(col) - centerCol ;
            float d = drow*drow + dcol+dcol ;

if ((rate > -rateThreshold) && (rate < rateThreshold)) {
               float weight = exp(-d/(2.0*sigma*sigma)) / (ROOT_TWOPI * sigma) ;

float angle = drow / 100.0 * PI ;
               weight = weight * sin(angle) ;

float sumV = float(rate)/ROOT_SUBF * weight ;
               float countV = abs(weight) ;

sum += sumV ;
               count += countV ;
            }
         }
      }
   }
   return sum / count ;
}
```

The invention claimed is:

1. An image data processing system for processing image data from at least one image sensor located on a transportation vehicle, the image processing system comprising:
an affine contour filter that extracts sub-pixel contour roots that are dimensionless points consistent across a plurality of frames of image data and represent boundaries of image data that represent an object within the image, wherein the contours undergo small affine changes including at least one of translation, rotation and scale in image data included in image data collected over a period of time; and
means for performing lateral contour tracking to track movement of the object within a field of view of the at least one sensor by aligning contours associated with the object in space-time, wherein contours of each incoming image included in the plurality of frames included in image data are aligned to a map frame to map the contours using tethers to track the object,
wherein each tether provides a connection between roots of similar polarity on two different frames and enables interpolation of locations of roots on a sub-pixel basis to associate roots across successive frames in the plurality of frames of image data.

2. The system of claim 1, wherein the system detects and/or identifies the object and object movement in the image data without specification of a size and shape of the object to be tracked prior to tracking.

3. The system of claim 1, wherein the detection and/or identification of the object and object movement generates object tracking data for output to for at least one assistive/autonomous driving functionality system utilized by the transportation vehicle.

4. The system of claim 1, wherein the means for performing lateral contour tracking tracks a point guaranteed to be on the object to be tracked as specified in a first image and, thereafter, determines relative size updates for the object on a periodic basis so as to determine whether the tracked object is appearing larger, thereby indicating a distance between the at least one sensor and the object is decreasing, or smaller, thereby indicating a distance between the at least one sensor and the object is increasing.

5. The system of claim 1, wherein the means for performing lateral contour tracking tracks position of the tracked object on a sub-pixel basis so as to generate stabilized video image data with reduced effect of relative motion of the at least one sensor.

6. The system of claim 5, further comprising means for performing contour scaled tracking using the stabilized video data wherein a scale change of contours associated with a tracked object are measured without prior knowledge of object size or shape.

7. The system of claim 5, further comprising means for performing rotation of image data to identify relative rotational movement between the at least one sensor and a tracked object to reduce or eliminate an effect of such movement.

8. The system of claim 1, wherein the affine contour filter and means for performing lateral contour tracking are implemented on a GPU chip.

9. The system of claim 1, wherein the affine contour filter and means for performing lateral contour tracking are implemented on an AI chip.

10. A method for processing image data from at least one image sensor located on a transportation vehicle, the image processing system comprising:
extracting sub-pixel roots of contours using an affine contour filter that extracts sub-pixel contour roots that are dimensionless points consistent across a plurality of frames of image data and represent boundaries of image data representing an object within the image, wherein the contours undergo small affine changes including at least one of translation, rotation and scale in image data included in image data collected over a period of time; and
performing lateral contour tracking to track movement of the object within a field of view of the at least one sensor by aligning contours associated with the object in space-time, wherein contours of each incoming image included in the plurality of frames included in image data are aligned to a map frame to map the contours using tethers to track the object, and wherein each tether provides a connection between roots of similar polarity on two different frames and enables interpolation of locations of roots on a sub-pixel basis to associate roots across successive frames in the plurality of frames of image data.

11. The method of claim 10, wherein the method detects and/or identifies the object and object movement in the image data without specification of a size and shape of the object to be tracked prior to tracking.

12. The method of claim 10, wherein the method detects and/or identifies the object and object movement generates object tracking data for output to for at least one assistive/autonomous driving functionality system utilized by the transportation vehicle.

13. The method of claim 10, wherein the lateral contour tracking tracks a point guaranteed to be on the object to be tracked as specified in a first image and, thereafter, determines relative size updates for the object on a periodic basis so as to determine whether the tracked object is appearing larger, thereby indicating a distance between the at least one sensor and the object is decreasing, or smaller, thereby indicating a distance between the at least one sensor and the object is increasing.

14. The method of claim 10, wherein the lateral contour tracking tracks position of the tracked object on a sub-pixel basis so as to generate stabilized video image data with reduced effect of relative motion of the at least one sensor.

15. The method of claim 14, further comprising performing contour scaled tracking using the stabilized video data wherein a scale change of contours associated with a tracked object are measured without prior knowledge of object size or shape.

16. The method of claim 14, further comprising performing rotation of image data to identify relative rotational movement between the at least one sensor and a tracked object to reduce or eliminate an effect of such movement.

17. An image data processing system for processing image data generated on a transportation vehicle, the image processing system comprising:
at least one sensor that generates image data representing an image that includes an object;
at least one processor coupled to the at least one sensor and including software that converts the image data into contour data using an affine contour filter that extracts sub-pixel contour roots that are dimensionless points consistent across a plurality of frames of image data and represent boundaries of image data representing the object within the image, wherein the contours undergo small affine changes including at least one of translation, rotation and scale in image data included in image data collected over a period of time;

wherein the at least one processor further includes software for performing lateral contour tracking to track movement of the object within a field of view of the at least one sensor by aligning contours associated with the object in space-time, wherein contours of each incoming image included in the plurality of frames included in image data are aligned to a map frame to map the contours using tethers to track the object, and wherein each tether provides a connection between roots of similar polarity on two different frames and enables interpolation of locations of roots on a sub-pixel basis to associate roots across successive frames in the plurality of frames of image data.

18. The system of claim 17, wherein the system detects and/or identifies the object and object movement in the image data without specification of a size and shape of the object to be tracked prior to tracking.

19. The system of claim 17, wherein the detection and/or identification of the object and object movement generates object tracking data for output to for at least one assistive/autonomous driving functionality system utilized by the transportation vehicle.

20. The system of claim 17, wherein the lateral contour tracking tracks a point guaranteed to be on the object to be tracked as specified in a first image and, thereafter, determines relative size updates for the object on a periodic basis so as to determine whether the tracked object is appearing larger, thereby indicating a distance between the at least one sensor and the object is decreasing, or smaller, thereby indicating a distance between the at least one sensor and the object is increasing.

21. The system of claim 17, wherein the lateral contour tracking tracks position of the tracked object on a sub-pixel basis so as to generate stabilized video image data with reduced effect of relative motion of the at least one sensor.

22. The system of claim 21, wherein the software further performs contour scaled tracking using the stabilized video data wherein a scale change of contours associated with a tracked object are measured without prior knowledge of object size or shape.

23. The system of claim 21, wherein the software further performs rotation of image data to identify relative rotational movement between the at least one sensor and a tracked object to reduce or eliminate an effect of such movement.

24. The system of claim 17, wherein the affine contour filter and the at least one processor are implemented on a GPU chip.

25. The system of claim 17, wherein the affine contour filter and the at least one processor are implemented on an AI chip.

* * * * *